United States Patent
Kumar et al.

(10) Patent No.: US 11,010,939 B2
(45) Date of Patent: May 18, 2021

(54) RENDERING OF CUBIC BEZIER CURVES IN A GRAPHICS PROCESSING UNIT (GPU)

(71) Applicant: Adobe Inc., San Jose, CA (US)

(72) Inventors: Harish Kumar, Noida (IN); Anmol Sud, New Delhi (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/568,907

(22) Filed: Sep. 12, 2019

(65) Prior Publication Data
US 2021/0082165 A1    Mar. 18, 2021

(51) Int. Cl.
*G06T 11/20* (2006.01)
*G06T 15/00* (2011.01)
*G06T 1/20* (2006.01)

(52) U.S. Cl.
CPC .............. *G06T 11/203* (2013.01); *G06T 1/20* (2013.01); *G06T 15/005* (2013.01)

(58) Field of Classification Search
CPC .................................................. G06T 11/203
See application file for complete search history.

(56) References Cited

U.S. PATENT DOCUMENTS

| | | | | |
|---|---|---|---|---|
| 6,674,435 B1 * | 1/2004 | Payne | ............ | G06F 17/175 345/440 |
| 7,928,984 B1 * | 4/2011 | Yhann | ............ | G06T 11/203 345/442 |
| 8,068,106 B1 * | 11/2011 | Yhann | ............ | G06T 11/203 345/442 |
| 9,384,570 B2 * | 7/2016 | Bolz | ............ | G06T 11/203 |
| 2009/0115867 A1 * | 5/2009 | Ishida | ............ | G06T 7/155 348/222.1 |
| 2009/0237401 A1 * | 9/2009 | Wei | ............ | G06T 11/203 345/423 |
| 2014/0043342 A1 * | 2/2014 | Goel | ............ | G06T 11/203 345/501 |
| 2017/0270710 A1 * | 9/2017 | Ben | ............ | G06T 11/40 |

(Continued)

OTHER PUBLICATIONS

Nehab, D and H Hoppe, "Random-Access Rendering of General Vector Graphics", ACM Transactions on Graphics (Proceedings of AMC SIGGRAPH Asia 2008), Aug. 2008, 10 pages.

(Continued)

*Primary Examiner* — Ryan R Yang
(74) *Attorney, Agent, or Firm* — Finch & Maloney PLLC

(57) ABSTRACT

Techniques are disclosed for a graphics processing unit (GPU) to process cubic Bezier curves, and render the cubic Bezier curves. In an example, the GPU receives a cubic Bezier curve. For example, a graphics pipeline of the GPU receives a plurality of corner points of a control polygon in the form of a patch primitive, the control polygon representing the cubic Bezier curve. The graphics pipeline tessellates the cubic Bezier curve into multiple quadratic Bezier curves, such that the multiple quadratic Bezier curves approximate the cubic Bezier curve. The number of quadratic Bezier curves generated in such a manner is adaptively based on a zoom level at which the cubic Bezier curve is to be displayed. For example, as and when the zoom level changes, new number of such quadratic Bezier curves are tessellated from the cubic Bezier curve. The quadratic Bezier curves are then rendered for display.

20 Claims, 14 Drawing Sheets

(56) References Cited

U.S. PATENT DOCUMENTS

2018/0033168 A1* 2/2018 Beri ...................... G06T 3/4084
2018/0144544 A1* 5/2018 Yoo ....................... G06T 15/005

OTHER PUBLICATIONS

"Tessellation", retrieved from the internet: https://www.khronos.org/opengl/wiki/Tessellation [retrieved Jul. 29, 2019], 12 pages.
Loop, C and J Blinn, "Resolution Independent Curve Rendering using Programmable Graphics Hardware", Jul. 2005 Transactions on Graphics (TOG)—(Siggraph 2005), Jan. 2005, 2 pages.
Chan, Eric, "Fast Antialiasing Using Prefiltered Lines on Graphics Hardware", retrieved from the Internet: http://people.csail.mit.edu/ericchan/articles/prefilter/ [retrieved Jul. 29, 2019], 6 pages.

* cited by examiner

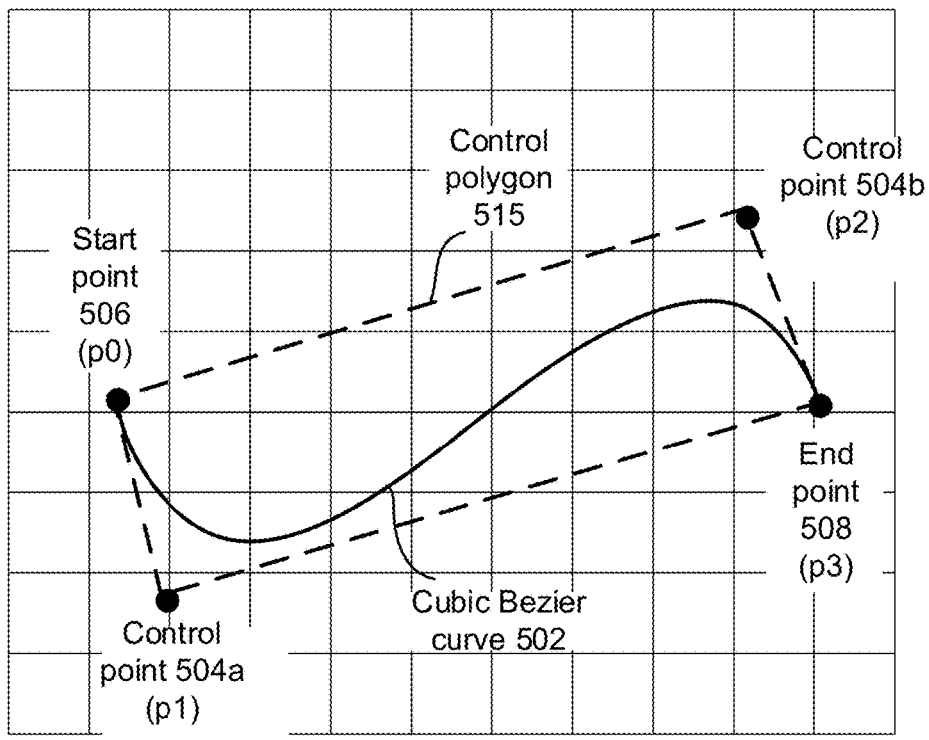
FIG. 5A1
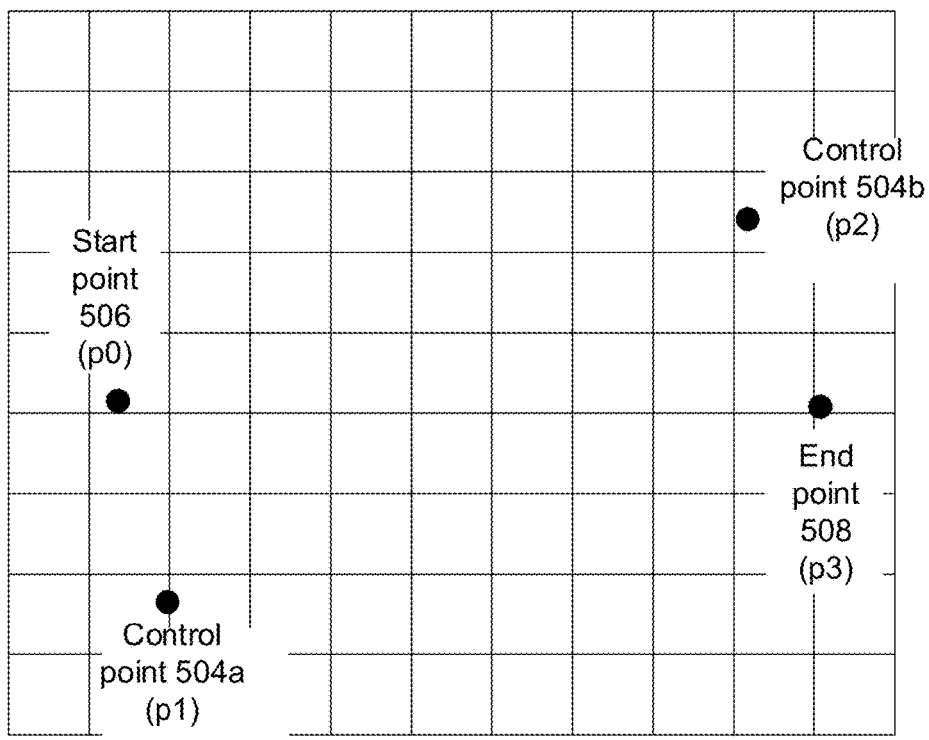
FIG. 5A2

RENDERING OF CUBIC BEZIER CURVES IN A GRAPHICS PROCESSING UNIT (GPU)

FIELD OF THE DISCLOSURE

This disclosure relates generally to digital image processing, and more specifically to techniques for rendering cubic Bezier curves.

BACKGROUND

Bezier curves are an integral part of vector graphics. For example, curved lines in vector graphics are often represented using cubic Bezier curves. As discussed in further detail herein later, there are many non-trivial challenges in efficiently rendering cubic Bezier curves for display.

SUMMARY

Techniques are disclosed for rendering a cubic Bezier curve in a Graphics Processing Unit (GPU). In some embodiments, a graphics pipeline of the GPU is programmed or otherwise configured to receive a cubic Bezier curve, and split the cubic Bezier curve into multiple quadratic Bezier curves. In some embodiments, to split the cubic Bezier curve into multiple quadratic Bezier curves, the GPU generates a plurality of vertices on the cubic Bezier curve, where the plurality of vertices divides the cubic Bezier curve into a plurality of segments. Subsequently, the GPU generates the plurality of quadratic Bezier curves, wherein each individual quadratic Bezier curve of the plurality of quadratic Bezier curves (i) is between corresponding two consecutive vertices of the plurality of vertices and (ii) approximates a corresponding segment of the plurality of segments of the cubic Bezier curve. In some embodiments, the cubic-to-quadratic subdivision is executed on the GPU hardware by multiple cores in parallel. The multiple quadratic Bezier curves collectively approximate the cubic Bezier curve. Subsequently, the GPU renders the plurality of quadratic Bezier curves for display.

For example, assume that "K" quadratic Bezier curves are generated from the cubic Bezier curve. In some embodiments, the number K of quadratic Bezier curves is computed by the GPU, based on a resolution or zoom level at which the Bezier curve is to be displayed. Thus, the cubic-to-quadratic subdivision is executed in real time on GPU hardware by multiple cores in parallel, as and when the user modifies the zoom level. Accordingly, the cubic Bezier curve is approximated by different number of multiple quadratic Bezier curves at different zoom levels, without any loss in accuracy.

BRIEF DESCRIPTION OF THE DRAWINGS

FIGS. 5A1, 5A2, 5B, 5C, 5D, 5E, 5F, 5G, 5H, and 5I illustrate example images depicting a manner in which a GPU renders a cubic Bezier curve, in accordance with some embodiments of the present disclosure.

DETAILED DESCRIPTION

Figure 1:
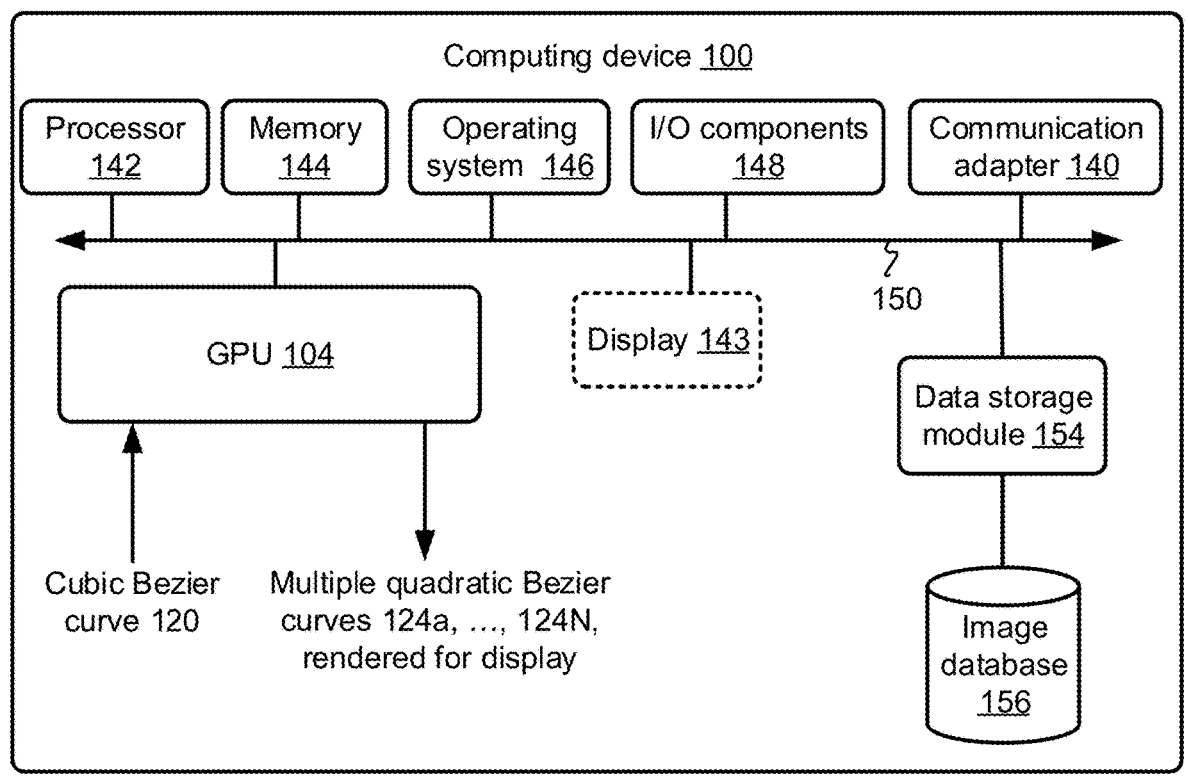
FIG. 1 is a block diagram schematically illustrating selected components of an example computing device configured to process and render cubic Bezier curves on a GPU of the computing device, in accordance with some embodiments of the present disclosure.

Techniques are disclosed for rendering a cubic Bezier curve in a Graphics Processing Unit (GPU). In an embodiment, a graphics pipeline of the GPU is programmed or otherwise configured to receive a cubic Bezier curve, and split the cubic Bezier curve into multiple quadratic Bezier curves. This cubic-to-quadratic subdivision is executed on GPU hardware by multiple cores in parallel. The multiple quadratic Bezier curves collectively approximate the cubic Bezier curve. The multiple quadratic Bezier curves are then rendered in the GPU. Advantageously, operations associated with splitting the cubic Bezier curve into multiple quadratic Bezier curves are performed entirely within the GPU. No Central Processing Unit (CPU) based preprocessing is needed.

General Overview

In vector graphics, Bezier curves are used to model smooth curves that can be scaled indefinitely. Types of Bezier curves include cubic Bezier curves and quadratic Bezier curves. A cubic Bezier curve is defined by four points in a plane, such as a start point, an end point, and two control points. Locations of these four points define the shape of the cubic Bezier curve. In contrast, a quadratic Bezier curve is defined by three points in a plane, such as a start point, an end point, and one control point. Locations of these three points define the shape of the quadratic Bezier curve.

Stroking of cubic Bezier curves is a common operation in creative workflows, where the goal is to generate another Bezier curve at a fixed offset from a given Bezier curve, but the process of rendering such stroked Bezier curves is computationally expensive and slows down the creative content creation process. In more detail, computation associated with displaying graphics, such as displaying Bezier curves, is shared between one or more Central Processing Units (CPUs) and one or more GPUs. For instance, techniques for rendering a cubic Bezier curve involve a pre-processing step of approximating a cubic Bezier curve by multiple lower degree Bezier curves, such as quadratic Bezier curves or lines. This pre-processing step is executed on CPUs. Such CPU-based pre-processing necessitates data transfer between CPU and GPU memories and is a major performance bottleneck in real time vector editing operations. The bottleneck manifests to the user in terms of slower rendering times, which can diminish a creator's user-experience. In particular, there may be a non-trivial delay between the artist's stroke on a given canvas and the time that stroke is actually rendered on the artist's display, and/or non-trivial delay between zooming in and/or zooming out an image. Thus, the creative process is slowed or otherwise encumbered.

As discussed herein previously, a cubic Bezier curve has two control points, whereas a quadratic Bezier curve has a single control point. Since a cubic Bezier curve has more control points than a quadratic Bezier curve, a cubic Bezier curve is more flexible in the path it takes between the two end points, relative to a quadratic Bezier curve. However, as noted above, there are non-trivial issues associated with techniques for rendering cubic Bezier curve.

For instance, in one such technique, a cubic Bezier curve is flattened into straight lines and the resulting lines are rendered on a GPU using antialiasing techniques. The flattening is executed on a CPU and the resulting lines are then uploaded to the GPU for rendering. For correct appearance of the curve, the curve should be flattened at each resolution level which results in rendering Bezier curves at a relatively very low frame rate. Such a technique may be optimized by embedding some of processing in a graphics pipeline using tessellation shaders, but there still remains a GPU hardware limitation of tessellating into 64 subdivisions. Given this hardware-based constraint of the GPU, CPU processing is still required at each resolution level to split the curve into multiple curves such that each curve can be approximated by 64 or less lines. So, CPU processing remains a performance bottleneck for such techniques. Furthermore, as the input cubic Bezier curve is flattened into straight lines, such straight lines in combination may not fully approximate the cubic Bezier curve, especially at higher zoom level. Thus, the final display of the curve at a higher zoom level may appear to be a collection of multiple straight lines, which may not be visually appealing. For example, for relatively higher zoom level, the approximation error may be visible to a user, and the rendered curve may not appear smooth enough to a user. Another possible technique includes approximating cubic Beziers into quadratic Beziers. In such a technique, a cubic Bezier curve is approximated by multiple quadratic Beziers in a CPU, and the quadratic Beziers are uploaded to the GPU for rendering. This technique generates better visible results than the above discussed flattening technique, as the cubic Bezier is approximated now using multiple quadratic Beziers. In this technique, cubic Beziers are split into quadratic Beziers only once, cached and then re-rendered at various zoom levels or resolution levels. However, the technique does not perform well in editing operations as needed in any creative tool. For example, because the cubic Bezier is split into multiple quadratic Beziers only once and the same splitting is used for all zoom levels (i.e., the splitting is not repeated for individual zoom levels), any approximation error between the cubic Bezier and multiple quadratic Beziers may be visible, especially at higher zoom level. For example, for relatively higher zoom level, the approximation error may be visible to a user, and the rendered curve may not appear smooth enough to a user. Furthermore, caching the multiple quadratic Beziers is memory inefficient. Moreover, such splitting of the cubic Bezier into multiple quadratic Beziers is performed in the CPU. Another possible technique includes directly rendering cubic Bezier curves on GPU hardware. However, such a solution again involves a complex preprocessing step executed on the GPU that involves classifying cubic Beziers into serpentine, cusp and loop and then computing the coefficients of algebraic form based on curve classification. Also, the computed coefficients have to be sent to GPU memory for evaluating the curve in the fragment shader stage of a programmable graphics pipeline, which increases CPU-to-GPU data transfer time.

Thus, techniques are provided herein to efficiently render cubic Bezier strokes. The techniques are particularly well-suited for rendering thin cubic Bezier strokes. As used herein, a thin cubic Bezier stroke is a stroke having a width of one device pixel or less. In an example embodiment, a GPU receives an input cubic Bezier curve, and splits that cubic Bezier curve into a plurality of quadratic Bezier curves that approximate the cubic Bezier curve. This splitting is also referred to herein as tessellation, and is accomplished by leveraging parallelism of a multi-core GPU.

According to an embodiment, assume that "K" quadratic Bezier curves are generated from the cubic Bezier curve. Although the K quadratic Bezier curves collectively approximate the cubic Bezier curve, there may be some error between the quadratic Bezier curves and the cubic Bezier curve (e.g., the quadratic Bezier curves may not exactly overlap the cubic Bezier curve). Such small error is acceptable, as long as the error is less than a threshold value. The error can be decreased by increasing the number K of quadratic Bezier curves used for approximating the cubic Bezier curve, although this may increase computational load and/or computational time for rendering the cubic Bezier curve. In some such embodiments, the number K of quadratic Bezier curves is computed by the GPU, based on a resolution or zoom level at which the Bezier curve is to be displayed. For example, if the Bezier curve is to be displayed at a relatively higher zoom level, a relatively higher value of K is selected; and if the Bezier curve is to be displayed at a relatively lower zoom level, a relatively lower value of K is selected.

For example, a user can choose to display the cubic Bezier curve at an initial zoom level. Thus, an initial value K1 is calculated based on the initial zoom level and the cubic Bezier curve is split into K1 number of quadratic Bezier curves, and the K1 number of quadratic Bezier curves are rendered and displayed. However, if user changes the zoom level, an updated value K2 is calculated, the cubic Bezier curve is split into K2 number of quadratic Bezier curves, and the K2 number of quadratic Bezier curves are rendered and displayed. That is, as and when the user changes the zoom level, the number K is updated, the GPU re-splits (or re-tessellates) the cubic Bezier curve into the updated K number of quadratic Bezier curves, and re-renders the quadratic Bezier curves. Thus, the cubic-to-quadratic subdivision is executed in real time on GPU hardware by multiple cores in parallel, as and when the user modifies the zoom level. Thus, the cubic Bezier curve is approximated by different number of multiple quadratic Bezier curves at different zoom levels, without any loss in accuracy. This change in the cubic-to-quadratic approximation is done "on the fly", as the user can change the zoom level multiple times and select any of innumerable possible zoom levels, as will be discussed in further detail herein.

The tessellation or splitting of the cubic Bezier curve into multiple quadratic Bezier curves is performed in a graphics pipeline of the GPU. In some embodiments, the graphics pipeline (also referred to simply as "pipeline") can receive primitives, such as lines, triangles, points, and "patches." A patch is defined as a geometrical shape having arbitrary number of vertices. For example, a polygon with three, four, five, or higher number of sides can be input to the pipeline as a "patch" primitive. For example, a control polygon of the cubic Bezier curve can be a quadrilateral, and the corner points or vertices of the quadrilateral control polygon of the cubic Bezier curve are input as a patch primitive to the pipeline.

In some embodiments, the generation, processing and/or rendering of the K quadratic Bezier curves, corresponding to the input cubic Bezier curve, are performed in parallel. For example, as will be discussed in further details, the graphics pipeline of the GPU has several stages, and one or more stages are invoked multiple times for the K quadratic Bezier curves. Merely as an example and as will be discussed in further details, a geometric shader operates in parallel to generate the K quadratic Bezier curves. Thus, the geometric shader is invoked K times, to at least in part parallelly generate the K quadratic Bezier curves. Hence, two or more of the K quadratic Bezier curves are generated at least partially simultaneously, i.e., in parallel.

For example, the GPU has multiple execution units (e.g., cores of the GPU), and each execution unit can execute multiple tasks in parallel (e.g., can execute multiple execution threads in parallel). Thus, the multiple execution units of the GPU can execute a plurality of tasks in parallel. The graphics pipeline utilizes this parallelism of the GPU to generate, process and/or render the K quadratic Bezier curves at least in part parallelly.

The parallelism is two-fold here. As noted above, given a specific cubic Bezier curve, generation, processing and/or rendering of K quadratic Bezier curves are performed in parallel. Furthermore, multiple cubic Bezier curves are also parallelly processed in the GPU. Thus, parallelism is two-fold—multiple cubic Bezier curves are processed within the GPU in parallel, and each cubic Bezier curve is also processed in parallel. This results in faster and more efficient computation.

In some embodiments, a patch primitive representing the cubic Bezier curve is input to a vertex shader of the pipeline. The vertex shader determines properties (e.g., position) of individual vertices of the control polygon, and passes the patch primitive through to a tessellation control shader (TCS) of the graphics pipeline of the GPU. The vertices of the control polygon are also referred to herein as corner points of the control polygon.

The TCS specifies tessellation levels for the control polygon. Tessellation, in its most basic form, is breaking down a polygon into smaller pieces. For example, a square can be tessellated into two triangles by splitting the shape along its diagonal. In the context of the cubic Bezier curve, the TCS determines the number K of quadratic Bezier curves in which the cubic Bezier curve is to be split or tessellated, where K is an appropriate integer, such as two, three, four, or higher. As previously discussed herein, the number K is based on a zoom level with which the cubic Bezier curve is to be viewed on a display, a length of the cubic Bezier curve, and/or a complexity or nature of the cubic Bezier curve.

For example, for a given input cubic Bezier curve, the TCS determines the number K of quadratic Bezier curves in which the cubic Bezier curve is to be split or tessellated— thus, the TCS is invoked once for the input Bezier curve. However, subsequent processing and/or rendering of individual ones of the K quadratic Bezier curves corresponding to the cubic Bezier curve are processed in parallel in the GPU.

In order to tessellate or split the cubic Bezier curve into K quadratic Bezier curves, a tessellation primitive generator (TPG) of the graphics pipeline of the GPU generates (K+1) number vertices on a straight-line segment, where the vertices are represented as V'1, V'2, V'(K+1). Subsequently, a tessellation evaluation shader (TES) of the graphics pipeline of the GPU maps the vertices V'1, V'2, V'(K+1) on the line to vertices V1, V2, ..., V(K+1) on the cubic Bezier curve. Thus, the TES divides the cubic Bezier curve into K segments, using the generated vertices V1, V2, ..., V(K+1) that are on the cubic Bezier curve at equal parametric distances.

In some embodiments, the TES or a primitive assembly generates K straight-line segments L1, L2, ..., LK, with each line between two consecutive vertices of the vertices V1, V2, ..., V(K+1). Thus, the K straight-line segments L1, L2, ..., LK collectively approximate the cubic Bezier curve.

In some embodiments, the TES is invoked (K+1) times, where each invocation of the TES is for processing a corresponding vertex of the vertices V1, V2, ..., V(K+1). In one such embodiment, the K straight-line segments L1, L2, ..., LK are generated in parallel by the TES.

A geometric shader of the graphics pipeline of the GPU receives the K straight-line segments L1, L2, ..., LK that approximate the cubic Bezier curve. The geometric shader is programmed to generate, from each line segment, a corresponding a quadratic Bezier curve. For example, quadratic Bezier curves Q1, Q2, ..., QK are respectively generated for line segments L1, L2, ..., LK. In an example, each quadratic Bezier curve Q aims to approximate a corresponding segment of the cubic Bezier curve. In some embodiments, the geometric shader also computes control points C1, C2, ..., CK for the quadratic Bezier curves Q1, ..., QK, respectively, and further computes a corresponding control polygon for each of the quadratic Bezier curves Q1, ..., QK.

In some embodiments, the geometric shader is invoked K times, where each invocation of the geometric shader is for generating a corresponding one of the K quadratic Bezier curves Q1, Q2, ..., QK. In one such embodiment, the K quadratic Bezier curves Q1, Q2, ..., QK are generated at least in part in parallel by the geometric shader.

A quadratic Bezier curve Qi (where Qi is any of Q1, ..., QK) lies entirely inside the corresponding control triangle formed by corresponding start point Vi, end point V(i+1), and control point Ci. However, it is possible that the quadratic Bezier curve is relatively close to the sides of the control triangle. For example, sections of the quadratic Bezier Qi curve near the start and end points may be relatively close, or fully or partially overlap, with the sides of the control triangle. This is because two sides of the control triangle are tangent to the quadratic Bezier curve Qi at the start and end points. If the control triangle is rasterized, this may result in problems of under coverage, and sections of the quadratic Bezier curve Qi overlapping the control triangle may not be fully rendered. In some embodiments, to overcome this problem of under coverage, the control triangle is expanded in multiple (such as all) directions, to generate a rectangular bounding box. For example, for a given control triangle, the corresponding rectangular region is output from the geometry shader for rasterization, where the rectangular region fully encompasses the control triangle. For example, there is a margin "p" between corners of the control triangle and the sides of the rectangular region, where the margin p can be one pixel-length, two pixel-length, or higher. Thus, the geometric shader generates K such rectangular areas for the corresponding K control triangles.

Continuing with this example embodiment, again, the geometric shader is invoked K times to generate K such rectangular areas for the corresponding K control triangles.

The generation of K such rectangular areas for the corresponding K control triangles may be performed at least in part in parallel.

The K such rectangular areas may be transmitted to a rasterizer of the graphics pipeline, which rasterizes the K quadratic Bezier curves. In an example, the rasterizer rasterizes the K quadratic Bezier curves at least in part in parallel.

In some embodiments, a fragment shader of the graphics pipeline receives the rasterized multiple quadratic Bezier curves, and renders the multiple quadratic Bezier curves employing any appropriate implicitization techniques. In some embodiments, the fragment shader also employs parallelism in rendering the multiple quadratic Bezier curves. For example, the degree of parallelism is per pixel and/or per fragment at the fragment shader stage of the graphics pipeline.

As noted above, parallelism is employed in processing the Bezier curves in the GPU. For example, multiple cubic Bezier curves can be parallelly processed in the GPU. For example, each cubic Bezier curve is split into multiple quadratic Bezier curves and rendered, and this process is performed in parallel for multiple Bezier curves. Additionally, given a specific cubic Bezier curve, the processing of (K+1) number of vertices, K line segments, K quadratic Bezier curves, and rendering of the K quadratic Bezier curves may also performed in parallel. Thus, parallelism is two-fold here—multiple cubic Bezier curves may be processed within the GPU in parallel, and each cubic Bezier curve may also be processed in parallel. This results in faster and more efficient computation.

For example, assume two input cubic Bezier curves Ca and Cb that are to be processed by the graphics pipeline and displayed at the same time. Also assume that the cubic Bezier curve Ca is to be converted into 10 quadratic Bezier curves Qa1, . . . , Qa10, and the cubic Bezier curve Cb is to be converted into 8 quadratic Bezier curves Qb1, . . . , Qb8. Each of the cubic Bezier curves Ca and Cb has four corresponding vertexes. Hence, the vertex shader is invoked four times per cubic Bezier curve, e.g., once for each vertex. Thus, the vertex shader is invoked eight times (e.g., four for each cubic Bezier curve), and in parallel. The TCS is invoked twice, once for each input cubic Bezier curve, and in parallel.

As the cubic Bezier curve Ca is to be converted into 10 quadratic Bezier curves, the cubic Bezier curve Ca will have 11 new vertices. Similarly, as the cubic Bezier curve Ca is to be converted into 8 quadratic Bezier curves, the cubic Bezier curve Ca will have 9 new vertices. Thus, the TES is invoked 20 times for the two cubic Bezier curves (i.e., 11 times for the cubic Bezier curve Ca, and 9 times for the cubic Bezier curve Cb).

There will be a total of 18 quadratic Bezier curves. Accordingly, the geometric shader is invoked 18 times.

In an example, the 20 invocations of the TES can be at least in part in parallel, and similarly, the 18 invocations of the geometric shader can be at least in part in parallel. For example, 20 instances of TES, i.e., 20 instances of corresponding threads or kernels, will run at least in part in parallel for processing the two input cubic Bezier curves Ca and Cb. Similarly, 18 instances of geometric shader, i.e., 18 instances of corresponding threads or kernels, will run at least in part in parallel for processing the two input cubic Bezier curves Ca and Cb.

As discussed herein, the GPU includes N number of execution units, which may be GPU cores. For the above example, one or more of the N number of execution units execute the 20 invocations of the TES at least in part in parallel, and one or more of the N number of execution units execute the 18 invocations of the geometric shader at least in part in parallel. Merely as an example, a first execution unit and a second execution unit of the GPU can share 18 threads corresponding to the 18 invocations of the graphics shader in parallel. In another example, merely the first execution unit can parallelly execute the 18 threads corresponding to the 18 invocations of the graphics shader.

Thus, a real-time graphics pipeline is provided for processing cubic Bezier curves, wherein the GPU receives the cubic Bezier curve, tessellates the cubic Bezier curve into multiple quadratic Bezier curves in a parallel fashion using multiple GPU cores, and renders the multiple quadratic Bezier curves for display. The entire processing is performed by the GPU. For example, advantageously, no CPU-based preprocessing operations to split the cubic Bezier curve into multiple quadratic Bezier curves are needed, thereby freeing the CPU resource for other computational processes. Moreover, as the GPU receives the single cubic Bezier curve, and not multiple equivalent quadratic Bezier curves, data transfer between the CPU and the GPU is relatively less, compared to systems where the CPU splits the cubic Bezier curve into multiple quadratic Bezier curves and transfers the multiple quadratic Bezier curves to the GPU. Thus, the discussed techniques result in the GPU achieving significant performance improvement, reduction in data transfer, and relatively less GPU memory usage. Numerous variations and embodiments will be appreciated in light of this disclosure.

System Architecture and Example Operations

FIG. 1 is a block diagram schematically illustrating selected components of an example computing device 100 (also referred to as device 100) configured to process and render cubic Bezier curves on a GPU 104 of the device 100, in accordance with some embodiments. As can be seen, the device 100 includes the GPU 104, which receives a cubic Bezier curve 120, splits the cubic Bezier curve 120 into multiple quadratic Bezier curves 124a, 124b, . . . , 124N, and renders the multiple quadratic Bezier curves 124a, 124b, . . . , 124N. Thus, as will be discussed in further detail in turn, splitting of the cubic Bezier curve 120 into multiple quadratic Bezier curves 124a, 124b, . . . , 124N, and subsequent rendering of the multiple quadratic Bezier curves may be performed within the GPU 104, e.g., performed exclusively on the GPU 104.

For example, advantageously, no preprocessing operations to split the cubic Bezier curve 120 into multiple quadratic Bezier curves may be performed by a CPU, thereby freeing CPU resource for other computational process. Moreover, as the GPU 104 receives the single cubic Bezier curve 120, and not multiple equivalent quadratic Bezier curves, data transfer between the CPU and the GPU is relatively less. For example, data transfer between the CPU and the GPU 104 is relatively less compared to a situation where the CPU would split the cubic Bezier curve into multiple quadratic Bezier curves and transfer the multiple quadratic Bezier curves to the GPU.

The device 100 can comprise, for example, a desktop computer, a laptop computer, a workstation, an enterprise class server computer, a handheld computer, a tablet computer, a smartphone, a set-top box, a game controller, and/or any other computing device that can render vector images comprising cubic Bezier curves for display.

In the illustrated embodiment, the device 100 includes various software modules configured to implement various functionalities of the device 100, as well as hardware configured to enable such implementation. These hardware and software components may include, among other things, a processor 142, memory 144, an operating system 146, input/output (I/O) components 148, a communication adaptor 140, data storage module 154, and the GPU 104. An image database 156 (e.g., that comprises a non-transitory computer memory) stores vector images comprising one or more Bezier curves that are to be rendered on a display 143. A bus and/or interconnect 150 is also provided to allow for inter- and intra-device communications using, for example, communication adaptor 140. Note that in an example, components like the operating system 146 can be software modules that are stored in memory 144 and executable by the processor 142. The bus and/or interconnect 150 is symbolic of all standard and proprietary technologies that allow interaction of the various functional components shown within the device 100, whether that interaction actually takes place over a physical bus structure or via software calls, request/response constructs, or any other such inter and intra component interface technologies, as will be appreciated.

In some embodiments, the device 100 comprises a display 143. In some other embodiments, the display 143 is external to, and communicatively coupled to, the device 100. As the display 143 can be included in the device 100 or can be external to the device 100, the display 143 is illustrated using dotted lines in FIG. 1.

Processor 142 can be implemented using any suitable processor, and may include one or more coprocessors or controllers, such as an audio processor, to assist in processing operations of the device 100. In some embodiments, the processor 142 comprises one or more CPUs. In some embodiments, memory 144 can be implemented using any suitable type of digital storage, such as one or more of a disk drive, solid state drive, a universal serial bus (USB) drive, flash memory, random access memory (RAM), or any suitable combination of the foregoing. Operating system 146 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also include one or more I/O components 148, such as one or more of a tactile keyboard, a display, a mouse, a touch sensitive display, a touch-screen display, a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

In an example, the components of the device 100 are in communication with one another or other components of the device 100 using the bus and/or interconnect 150, as previously discussed. The components of the device 100 can be in communication with one or more other devices including other computing devices of a user, server devices (e.g., cloud storage devices), licensing servers, or other devices/systems. Although the components of the device 100 are shown separately in FIG. 1, any of the subcomponents may be combined into fewer components, such as into a single component, or divided into more components as may serve a particular implementation.

Figure 2A:
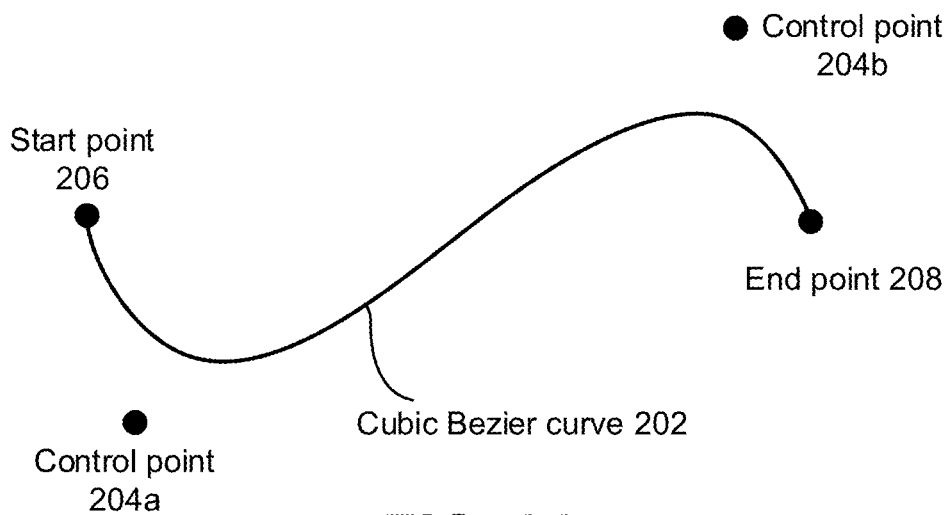
FIG. 2A illustrates an example of a cubic Bezier curve.
Figure 2B:
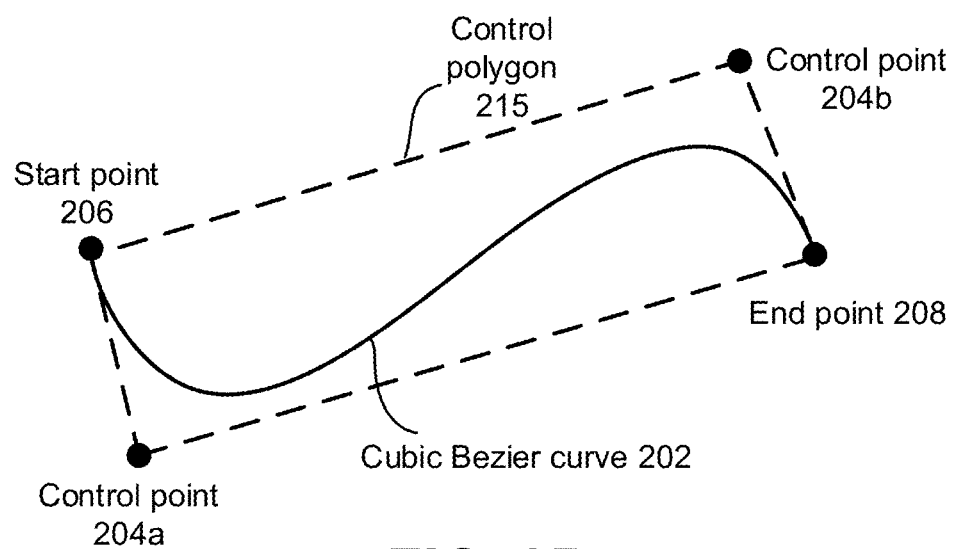
FIG. 2B illustrates a control polygon of the cubic Bezier curve of FIG. 2A.

FIG. 2A illustrates an example of a cubic Bezier curve 202, and FIG. 2B illustrates a control polygon 215 of the cubic Bezier curve 202 of FIG. 2A. In vector graphics, Bezier curves may be used to model smooth curves that can be scaled indefinitely, and Bezier curves are integral part of vector graphics. Cubic Bezier curves, such as the cubic Bezier curve 202 of FIG. 2A, may be defined by four points in a plane, such as a start point 206, an end point 208, and two control points 204a, 204b. Locations of these four points define the shape of the cubic Bezier curve 202. The cubic Bezier curve 202 starts at the start point 206 going toward the control point 204a, and arrives at the end point 208 coming from the direction of the control point 204b. Usually, the cubic Bezier curve does not pass through the control points 204a, 204b—these points may be there to provide directional information. The distance between the control points 204a, 204b determines how far and/or how fast the curve moves towards the control point 204a, before turning towards the control point 204b. A control polygon of a Bezier curve is formed by the endpoints of the curve and one or more control points. The control polygon 215, which is a rectangle, is defined by the four points 206, 208, 204a, 204b. Thus, given the control polygon 215, the cubic Bezier curve 202 can be uniquely derived. In an example, the four points 206, 208, 204a, 204b form vertices or corner points of the control polygon 215.

Figure 3A:
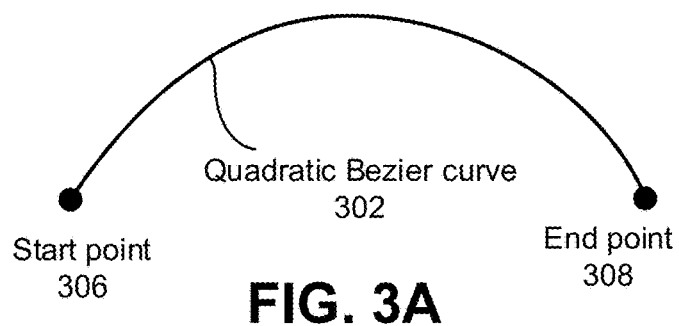
FIG. 3A illustrates an example of a quadratic Bezier curve.
Figure 3B:
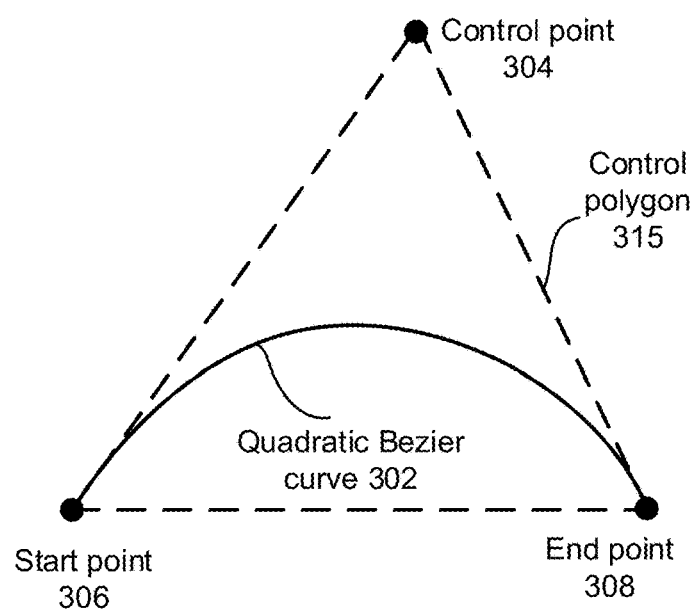
FIG. 3B illustrates a control polygon of the quadratic Bezier curve of FIG. 3A.

FIG. 3A illustrates an example of a quadratic Bezier curve 302, and FIG. 3B illustrates a control polygon 315 of the quadratic Bezier curve 302 of FIG. 3A. Quadratic Bezier curves, such as the quadratic Bezier curve 302 of FIG. 3A, may be defined by three points in a plane, such as a start point 306, an end point 308, and one control point 304. Locations of these three points define the shape of the quadratic Bezier curve 302. The quadratic Bezier curve 302 starts at the start point 306 going toward the control point 304, and arrives at the end point 308 coming from the direction of the control point 304. The control polygon 315, which is a triangle, is defined by the three points 306, 308, 304. Thus, given the control polygon 315, the quadratic Bezier curve 302 can be uniquely derived. In an example, the three points 306, 308, 304 form vertices or corner points of the control polygon 315. Since a cubic Bezier curve has more control points (i.e., two control points) than a quadratic Bezier curve, a cubic Bezier curve is more flexible in the path it takes between the two end points than a quadratic Bezier curve.

As will be discussed in further details, in some embodiments, the GPU 104 is configured to render cubic Bezier strokes, including thin cubic Bezier strokes. For example, the GPU 104 is configured for parallel computation of quadratic Bezier curves that approximate a cubic Bezier curve. For each such computed quadratic Bezier, a coverage area is computed to be rasterized on GPU hardware. The coverage area includes an offset of some predefined pixels (e.g., defined to 1 pixel) around the Bezier curve, to ensure that there is no under-coverage where a quadratic Bezier curve is close to its control triangle. Each quadratic Bezier is then rendered using implicit representation of quadratic Bezier curves.

Figure 4:
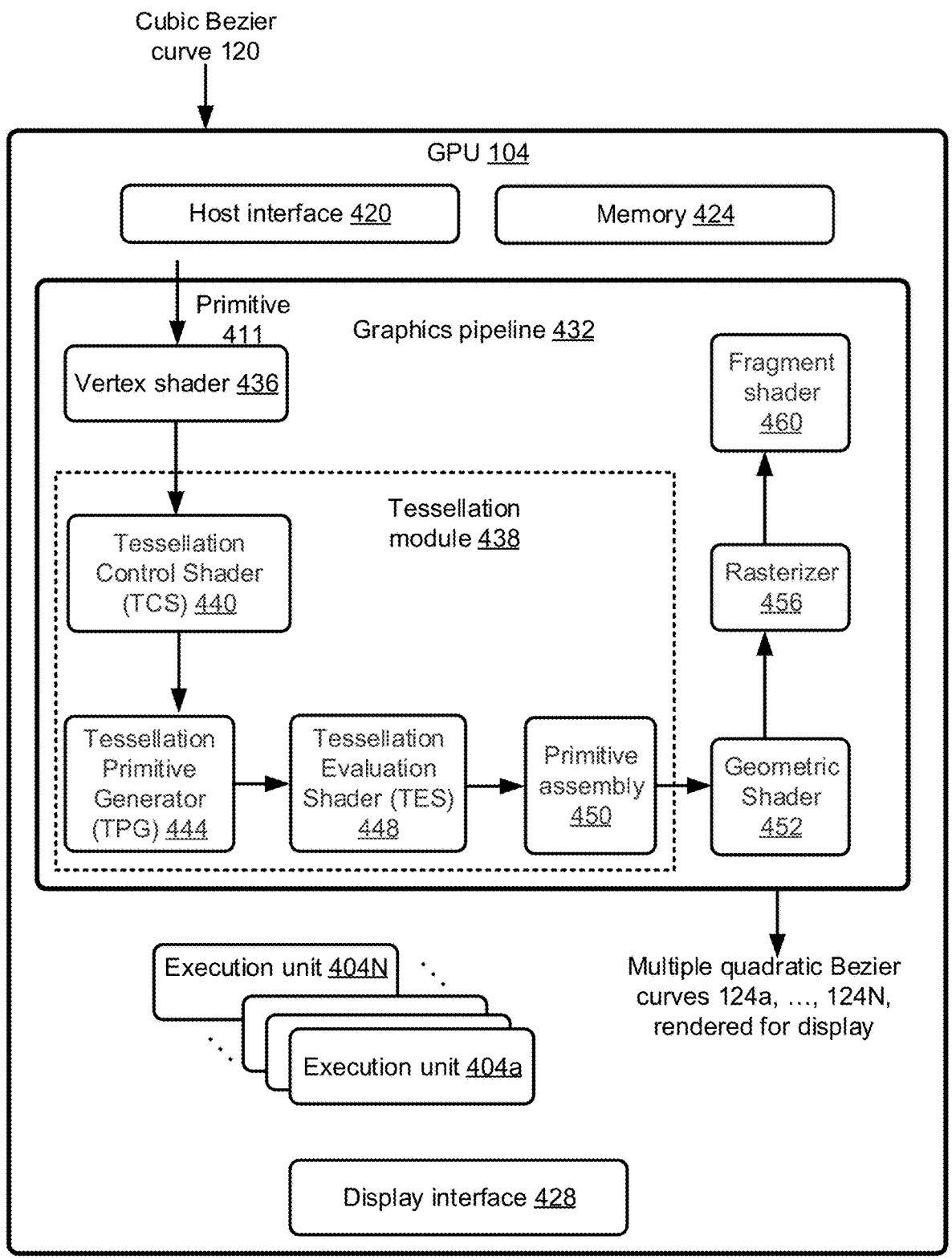
FIG. 4 is a block diagram schematically illustrating selected components of a GPU configured to process and render cubic Bezier curves, in accordance with some embodiments of the present disclosure.

FIG. 4 is a block diagram schematically illustrating selected components of the GPU 104 of the computing device 100 of FIG. 1, where the GPU 104 is configured to process and render cubic Bezier curves, in accordance with some embodiments. In some embodiments, the GPU 104 includes numerous specialized hardware and/or software components configured to optimize the speed of rendering graphics output. For example, the GPU 104 includes specialized components for rendering three-dimensional structures and applying textures to surfaces, although not all such components are illustrated in FIG. 4. It is contemplated that GPU architectures other than the example architecture of FIG. 4 may also be suitable for implementing some aspects of the techniques described herein.

In some embodiments, the GPU 104 may include a host interface 420 configured to communicate with a data source. The GPU 104 receives the cubic Bezier curve 120 from the data source. The data source can be a CPU of the processor 142, the memory 144, the data storage module 154, and/or another suitable electronic computational component external to or internal to the device 100. For example, the data source provides input data and/or executable program code to the GPU 104. In some embodiments, the host interface 420 permits bi-directional communication between the GPU 104 and the data source.

In some embodiments, the GPU 104 also includes a display interface 428 for providing output data to a data target, such as the display 143. For example, the GPU 104 drives the display 143 by providing graphics data (e.g., multiple quadratic Bezier curves 124a, . . . , 124N, rendered for display) to the display 143.

In some embodiments, the GPU 104 includes memory 424. The GPU memory 424 (also sometimes referred to as video memory) comprise, for example, random-access memory (RAM) or another suitable memory type, which is accessible to other GPU components. In some other embodiments, the memory 424 is external to the GPU 104. In some embodiments, the memory 424 stores various types of data and instructions, such as input data to the GPU 104, output data from the GPU 104, program instructions for performing various tasks within the GPU 104, etc. In some embodiments, the GPU 104 is also configured to access memory 144 of the device 100 via the host interface 420.

In some embodiments, the GPU 104 includes a plurality of execution units 404a, 404b, . . . , 404N, where N is an appropriate integer. Using the execution units 404a, . . . , 404N, the GPU 104 processes a plurality of tasks in a substantially parallel manner, such that a plurality of the execution units 404a, . . . , 404N may be simultaneously in use. For instance, the execution units 404 processes, in parallel, various pixels, fragments and/or vectorized RGBA/CMYKA data. As additional examples, various shaders, such as a geometry shader 452 of the GPU 104 (discussed herein later), processes data, such as different primitives (e.g., triangles) concurrently. In some further embodiments, each of the execution units 404a, . . . , 404N may perform tasks independent of the other execution units. In an example, an individual execution unit can process various tasks in parallel, e.g., using multiple parallel execution threads. Additionally, tasks can be shared and executed in parallel among the various execution units 404. The execution units 404 are, for example, cores of the GPU 104.

In some embodiments, the GPU 104 comprises a graphics pipeline 432 configured to receive the cubic Bezier curve 120, and output rendered version of the multiple quadratic Bezier curves 124a, . . . , 124N. Various components of the graphics pipeline 432 may be implemented as hardware components, and/or may be software modules that are stored in the memory 424 and executable by one or more of the execution units 404a, . . . , 404N.

As illustrated, the GPU 404 comprises a vertex shader 436, a tessellation module 438, a geometry shader 452, a rasterizer 456, and a fragment shader 460, each of which will be discussed in further details herein in turn. In some embodiments, the tessellation module 438 comprises a tessellation control shader (TCS) 440, a tessellation primitive generator (TPG) 444, a tessellation evaluation shader (TES) 448, and/or a primitive assembly 450. In some embodiments, some of the components of the graphics pipeline 432 (also referred to herein as pipeline 432) are programmable or configurable to perform certain specific tasks, as will be discussed herein in further detail. For example, one or more of (or each of) the vertex shader 436, TCS 440, TES 448, geometry shader 452, and the fragment shader 460 are programmable—hence, these components are also referred to herein as "programmable stage" of the GPU 104. In an example, the TPG 444, the primitive assembly 450, and/or the rasterizer 456 may not be programmed or configured—hence, these components are also referred to herein as "fixed stage" of the GPU 104.

In some embodiments, inputs to the pipeline 432 are in the form of primitives 411. In an example, the pipeline 432 can receive basic primitives, such as lines, triangles, and points, and output the final geometry to a display screen, such as the display 143. In an example, in addition to lines, triangles, and points, the pipeline 432 can also receive "patches" as primitives. A patch is defined as a geometrical shape having arbitrary number of vertices. For example, a polygon with three, four, five, or higher number of sides can be input to graphics pipeline 432 as a "patch" primitive. The concept of patch primitive enables the GPU 104 to work with arbitrary shapes within the graphics pipeline 432.

In some embodiments, as the pipeline 432 can receive patch primitives (e.g., in addition to various other basic primitives, such as lines, triangles, and points), the cubic Bezier curve 120 is input to the pipeline 432 as a patch primitive. For example, a control polygon of the cubic Bezier curve 120 can be a quadrilateral (e.g., as discussed with respect to FIG. 2B), and the quadrilateral control polygon of the cubic Bezier curve 120 is input as a patch primitive 411 to the pipeline 432.

In some embodiments, the primitives input to the pipeline 432, including the patch primitive 411, is received by the vertex shader 436. As discussed, the patch primitive 411 is a patch defined by the corner points or vertices of the control polygon of the cubic Bezier curve 120. Thus, the vertex shader 436 can receive the four corner points of the control polygon of the cubic Bezier curve 120 as patch primitive. The patch primitive 411 is resolution independent, such that should an event occur that alters the displayed resolution of the curve on-screen, such as the zooming-in on the curve by the user, the GPU can render the resolution change using the same patch primitive 411.

Figure 5B:
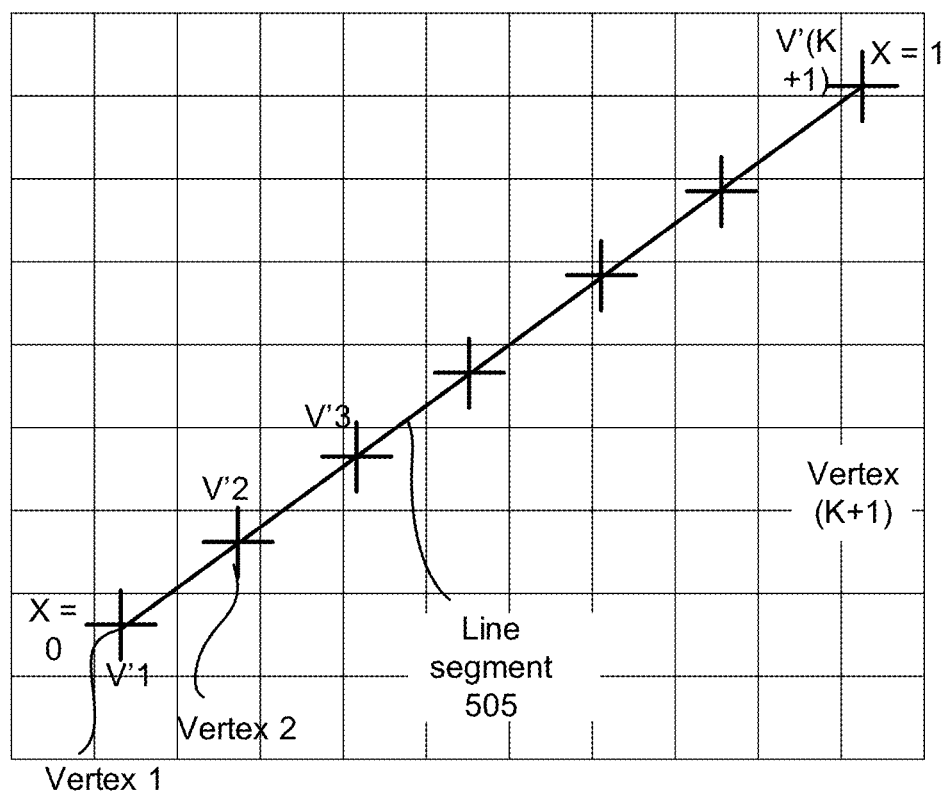

FIGS. 5A1, 5A2, 5B, 5C, 5D, 5E, 5F, 5G, 5H, and 5I illustrate images depicting a manner in which the GPU 104 renders a cubic Bezier curve 502, in accordance with some embodiments. Illustrated in FIG. 5A1 is the cubic Bezier curve 502, which can be same as the cubic Bezier curve 120 of FIG. 4. In FIG. 5A1, the cubic Bezier curve 502 is overlaid on a grid, where the grid is illustrated for purposes of clarity and may not be associated with the rendering process. As discussed with respect to FIG. 2, the cubic Bezier curve 502 is defined by a quadrilateral control polygon 515. The quadrilateral control polygon 515 connects a start point 506, an end point 508, and two control points 504a, 504b of the cubic Bezier curve 502. The vertex shader 436 of the pipeline 432 receives the patch primitive 411, which is the control polygon 515 of the cubic Bezier curve 502. In an example, the pipeline 432 (e.g., the vertex shader 436 of the pipeline 432) receives the control polygon 515 in the form of its corner points. That is, the vertex shader 436 receives the vertices or the control polygon 515 of the cubic Bezier curve 502, where the corner points are illustrated in FIG. 5A2. The corner points of the control polygon 515 are the start point 506, the end point 508, and the control points 504a, 504b of the cubic Bezier curve 502. The vertex shader 436 determines properties (e.g., position) of individual vertices.

The vertices of the control polygon 515 are also referred to herein as corner points of the control polygon 515. For example, the corner points of the control polygon 515 comprise the start point 506, the end point 508, and the control points 504a, 504b of the cubic Bezier curve 502.

The TCS 440 is invoked for the corner points of the control polygon 515. The TCS 440 takes an input patch and generates an output patch. Merely as an example, as the control polygon 515 has four corner points, the TCS 440 is invoked once per patch. The TCS specifies tessellation levels for the control polygon 515. The tessellation levels may be assigned to predefined output variables of TCS.

Tessellation, in its most basic form, is breaking down a polygon into finer pieces. A square can be tessellated into two triangles by splitting the shape along its diagonal. In the context of the cubic Bezier curve 502, the TCS 440 determines a number of quadratic Bezier curves in which the cubic Bezier curve 502 is to be sub-divided or split. For example, the cubic Bezier curve 502 represented by the four corner points (e.g., which may be the start point 506, control points 504a, 504b, and end point 508) has to be sub-divided into quadratic Bezier curves Q1, Q2, . . . , QK, i.e., "K" number of quadratic Bezier curves, where K is an appropriate integer, such as two, three, four, or higher. In some embodiments, the TCS 440 computes a number of quadratic Bezier curves (i.e., K) into which the input cubic Bezier curve is to be subdivided. For example, a tessellation parameter "Abstract patch" of the TCS 440 is set to "isolines", a tessellation parameter "gl_TessLevelOuter[0]" of the TCS 440 is set to 1, and a tessellation parameter "gl_TessLevelOuter[1]" of the TCS 440 is set to K, implying that the input cubic Bezier curve is to be subdivided into K quadratic Bezier curves.

The number "K" is computed based on a variety of factors, such as resolution or zoom level (e.g., magnification level) at which the cubic Bezier curve 502 is to be displayed (details of resolution dependent computation of K is discussed herein later with respect to FIG. 6), a length of the cubic Bezier curve 502, and/or a complexity or nature of the cubic Bezier curve 502. For example, the higher the zoom level or resolution of displaying the cubic Bezier curve 502, the higher is the number K. Similarly, the higher the length of the cubic Bezier curve 502, the higher is the number K.

The TPG 444 generates vertices V'1, V'2, . . . , V'(K+1), i.e., (K+1) number vertices on a line segment 505, based on the number "K" generated by the TCS 440, as illustrated in FIG. 5B. Thus, the TPG 444 generates new (K+1) vertices based on the tessellation parameters output by the TCS 440. The (K+1) vertices divide the line segment 505 into K equal-length sections. In some embodiments, output type of the TPG 444 is set to "isolines." By setting the output type of the TPG 444 to isolines, the tessellation module 438 maps the cubic Bezier curve 502 with a single line 505 starting at x=0 and ending at x=1. It is to be noted that the line segment 505 is a straight line, and does not follow the cubic Bezier curve 502.

The TES 448 is invoked once for each generated vertex of the (K+1) number vertices of the line segment 505. For example, the TES 448 is invoked (K+1) number of times. The TES 448 generates, for each vertex of the vertices V'1, V'2, V'(K+1), a corresponding value gl_TessCoord.x. This value represents a distance of the newly generated vertex V' from a starting point of line 505, i.e., from a point x=0.

For example, for the vertex V'1, the TES 448 generates value gl_TessCoord.x1, which represents a distance between the vertex V'1 and the starting point of the line 505 (x=0 point)—in the example of FIG. 5B, this value of zero, as the vertex V'1 and the starting point of the line 505 coincides. Similarly, for the vertex V'2, the TES 448 generates value gl_TessCoord.x2, which represents a distance between the vertex V'2 and the starting point of the line 505 (x=0 point). Similarly, for the vertex V'3, the TES 448 generates value gl_TessCoord.x3, which represents a distance between the vertex V'3 and the starting point of the line 505 (x=0 point), and so on.

Figure 5C:
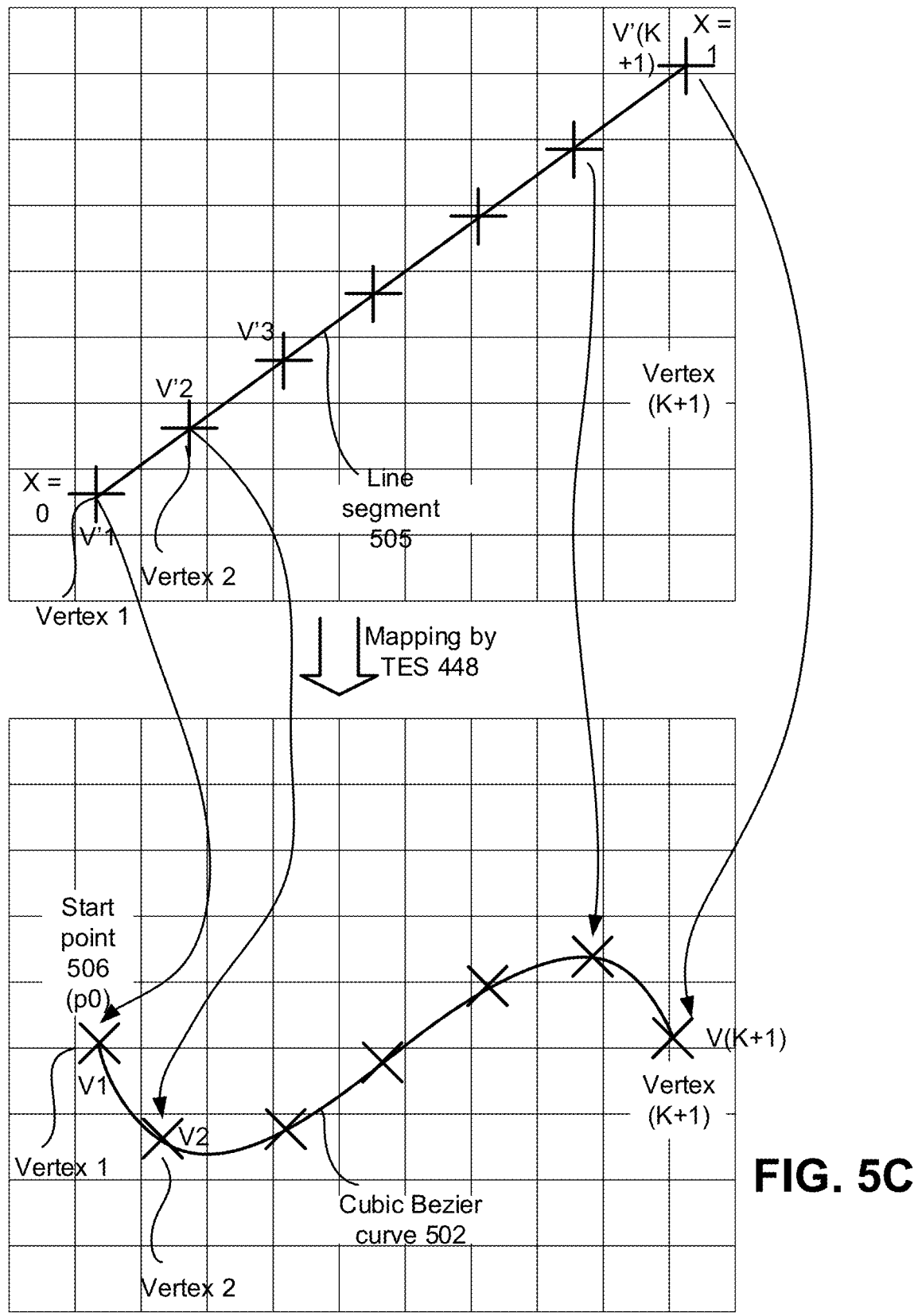

Subsequently, the TES 448 uses the value of gl_TessCoord.x as parametric value 't' and computes the value of a point or vertex lying on the cubic Bezier curve 502 at t=gl_TessCoord.x. Thus, as illustrated in FIG. 5C, the TES 448 uses the value gl_TessCoord.x2 of the vertex V'1 on the line 505 to compute a vertex V1 on the cubic Bezier curve 502. Similarly, the TES 448 uses the value gl_TessCoord.x2 of the vertex V'2 on the line 505 to compute a vertex V2 on the cubic Bezier curve 502.

Thus, at the end of TES stage, there may be (K+1) distinct points (including start and end points), such as vertices V1, V2, . . . , V(K+1), lying on the cubic Bezier curve 502 at equal parametric distance. Put differently, the vertices V'1, V'2, . . . , V'(K+1) on the line 505 are mapped to the vertices V1, V2, . . . , V(K+1) on the cubic Bezier curve 502, as illustrated in FIG. 5C.

Figure 5D:
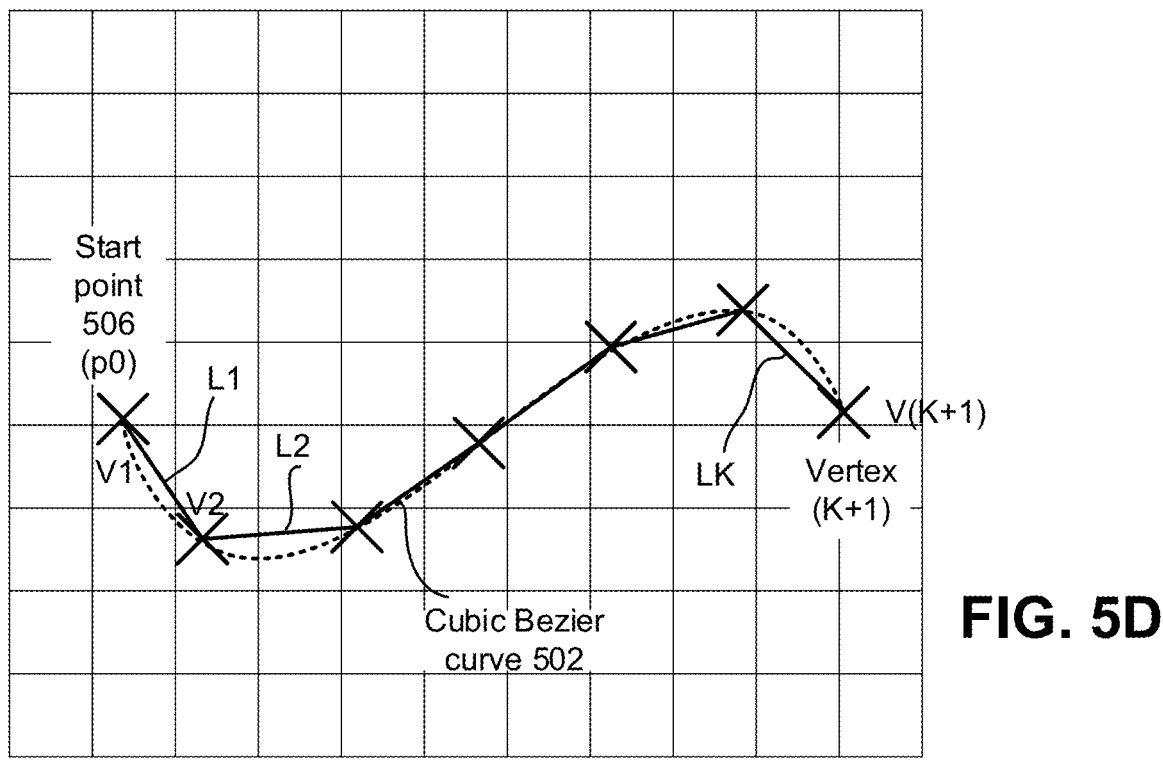

In some embodiments, the cubic Bezier curve 502 is approximated using K straight-line segments L1, L2, . . . , LK, with each line between two consecutive vertices of the vertices V1, V2, . . . , V(K+1), as illustrated in FIG. 5D. For example, in FIG. 5D, the cubic Bezier curve 502 is illustrated using dotted line (e.g., as the cubic Bezier curve 502 is not received by the geometry shader 452), and the line segments L1, . . . , LK are illustrated using solid lines between the vertices V1, V2, . . . , V(K+1). Thus, the input to the geometry shader 452 may be the line segments L1, . . . , LK formed using pair of consecutive vertices output from the TES 448. In some embodiments, the line segments are formed by the TES 448, while in some other embodiments the line segments are formed by the primitive assembly 450 between the TES 448 and the geometric shader 452.

Figure 5E:
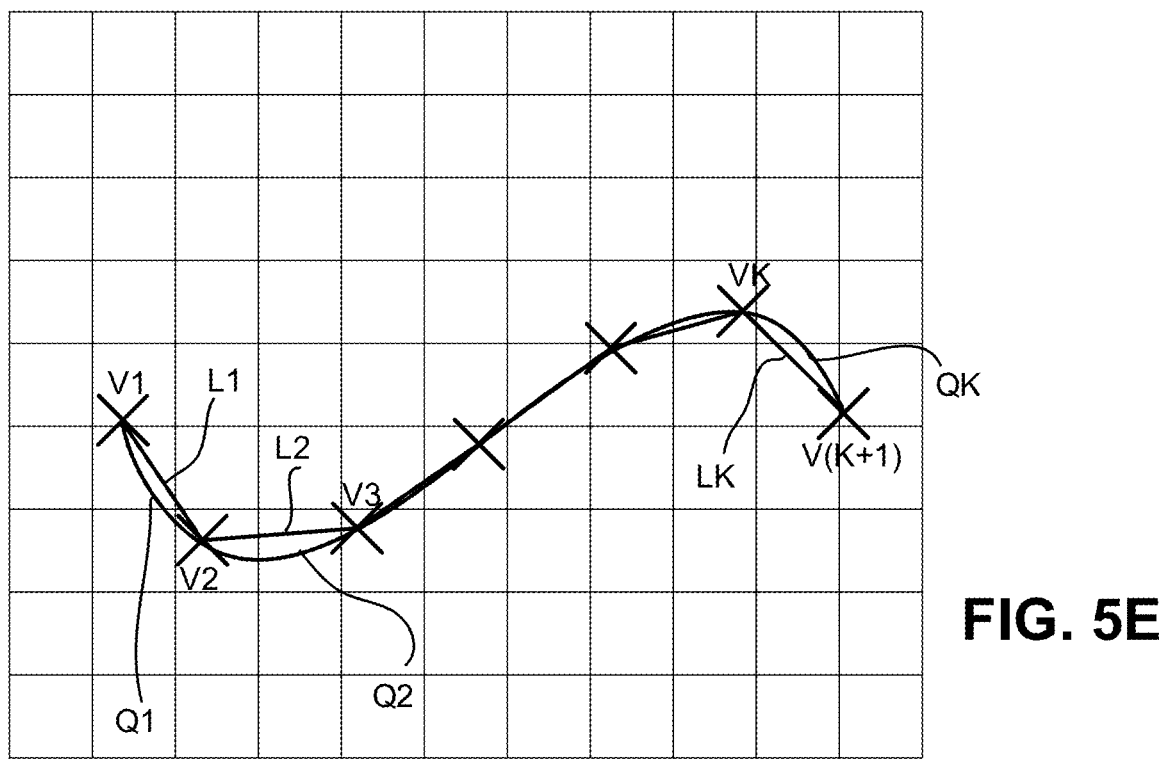

After the line segments L1, . . . , LK are input to the geometric shader 452, the geometric shader 452 is invoked once for each of the line segments L1, . . . , LK. For example, the geometric shader 452 is invoked K times. The geometric shader 452 is programmed or configured to generate, from each line segment, a corresponding a quadratic Bezier curve. For example, as illustrated in FIG. 5E, quadratic Bezier curves Q1, Q2, . . . , QK are respectively generated for line segments L1, L2, . . . , LK. In FIG. 5E, the cubic Bezier curve 502 is not illustrated—rather, the quadratic Bezier curves Q1, . . . , QK approximating the cubic Bezier curve 502 is illustrated. In an example, as there are K quadratic Bezier curves Q1, . . . , QK, the geometric shader 452 is invoked K times. The geometric shader 452, thus, replaces each of the line segments L1, . . . , LK with a corresponding one of the quadratic Bezier curves Q1, . . . , QK.

Given any two vertices on a cubic Bezier curve and given the start, end, and two control points of the cubic Bezier curve, one or more quadratic Bezier curves that approximate portion of the cubic Bezier curve between those two vertices can be generated. Thus, in an example, each quadratic Bezier curve Q aims to approximate a corresponding portion of the cubic Bezier curve 502. For example, the quadratic Bezier curve Q1 between the vertices V1, V2 approximates a section of the cubic Bezier curve 502 between the vertices V1, V2; the quadratic Bezier curve Q2 approximates a section of the cubic Bezier curve 502 between the vertices V2, V3; the quadratic Bezier curve QK approximates a section of the cubic Bezier curve 502 between the vertices VK, V(K+1); and so on. Thus, the combination of the quadratic Bezier curves Q1, . . . , QK approximates the cubic Bezier curve 502. As discussed, in some embodiments, the generation of the quadratic Bezier curves Q1, . . . , QK are performed by the geometric shader 452.

In an example, although the quadratic Bezier curves Q1, . . . , QK approximate the cubic Bezier curve 502, there may be some error between the quadratic Bezier curves Q1, . . . , QK and the cubic Bezier curve 502 (e.g., the quadratic Bezier curves Q1, . . . , QK may not exactly overlap the cubic Bezier curve 502). Such small error is acceptable, as long as the error is less than a threshold value. The error can be decreased by increasing the number K, where (K+1) is the number of vertices generated in FIG. 5B. Thus, increasing the number K, and thus increasing the number of quadratic Bezier curves Q1, . . . , QK, increases a granularity with which the quadratic Bezier curves follow or approximate the cubic Bezier curve 502.

Figure 5F:
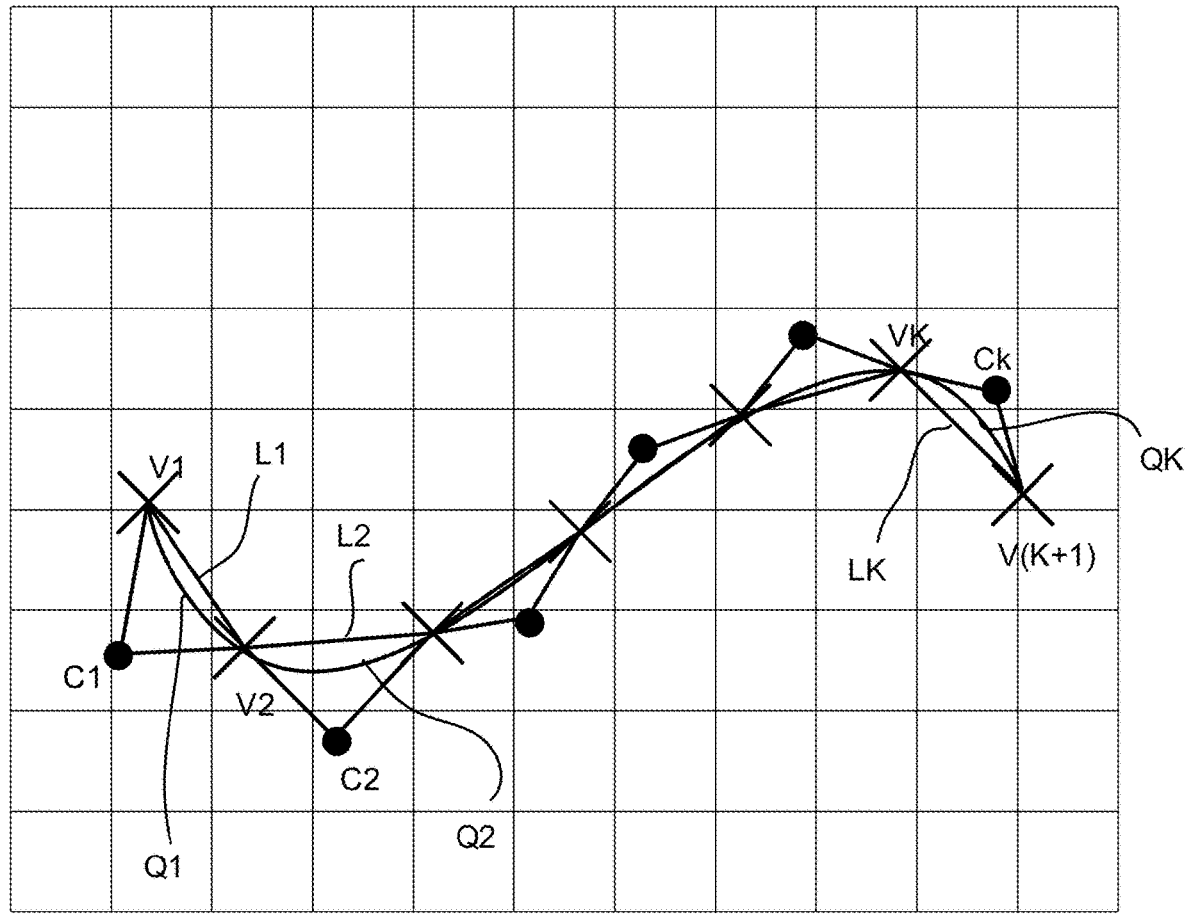

In some embodiments, the geometric shader 452 also computes control points C1, C2, . . . , CK for the quadratic Bezier curves Q1, . . . , QK, respectively, as illustrated in FIG. 5F. For example, the control point C1 is computed for the quadratic Bezier curve Q1, the control point C2 is computed for the quadratic Bezier curve Q2, the control point CK is computed for the quadratic Bezier curve QK, and so on. FIG. 5F also illustrates control polygons (e.g., which are control triangles) for each of the quadratic Bezier curves Q1, . . . , QK. For example, a first control triangle for the quadratic Bezier curve Q1 is defined by a line joining vertex V1 and control point C1, a line joining vertex V2 and control point C1, and the line segment L1. Put differently, the vertices V1 and V2 form the start and end point of the quadratic Bezier curve Q1, with C1 being the control point—thus, points V1, V2, and C1 uniquely define the quadratic Bezier curve Q1. Similar control triangles may also be defined for the remaining quadratic Bezier curves.

Thus, the output of the geometric shader 452 includes K quadratic Bezier curves Q1, . . . , QK, which collectively approximate the cubic Bezier curve 502. Thus, the input cubic Bezier curve 502 is split into K quadratic Bezier curves Q1, . . . , QK. The generation of the K quadratic Bezier curves Q1, . . . , QK from the cubic Bezier curve 502 is performed entirely within the GPU 104, e.g., within the pipeline 432. No pre-preprocessing of the cubic Bezier curve 502 is performed in a CPU to split the cubic Bezier curve 502 into multiple quadratic Bezier curves. The cubic Bezier curve 502 is tessellated into multiple quadratic Bezier curves Q1, . . . , QK, and this tessellation is executed on GPU cores (e.g., GPU execution units 404a, . . . , 404N) of the GPU 104 in parallel. Note that parallelism is two-fold here: (i) multiple cubic Bezier curves may be input to the pipeline 432 in a single draw call, and so, the pipeline 432 is running in parallel on each patch, i.e., running in parallel on each cubic Bezier curve, and (ii) the pipeline 432 may be executed in parallel for vertices and line segments corresponding to individual cubic Bezier curves. Put differently, the pipeline 432 handles the (K+1) number of vertices, K line segments, and/or K quadratic Bezier curves of a single input cubic Bezier curve in parallel. The pipeline 432 also handles multiple such cubic Bezier curves in parallel as well. This leads to a two-fold parallelism, leading to faster execution time.

The output of the geometric shader 452 is provided to the rasterizer 456. The multiple quadratic Bezier curves Q1, . . . , QK may then be rasterized by the rasterizer 456, e.g., in the order in which they were provided to the rasterizer 456. The result of rasterizing a primitive is a sequence of "fragments," which may then be processed by the fragment shader 460. A fragment is a collection of values produced by the rasterizer 456. Each fragment represents a sample-sized segment of a rasterized primitive (e.g., where a primitive may be the start and end points and the control points of individual ones of the multiple quadratic Bezier curves Q1, . . . , QK). The size covered by a fragment is related to the pixel area. At least one fragment is produced for every pixel area covered by the primitive being rasterized. An input fragment, built by the rasterizer, enters the fragment shader 460. After arbitrary processing, the fragment shader 460 writes a number of values. These values represent the output fragment, and this output fragment is passed along, e.g., for displaying in the display 143.

Figure 5G:
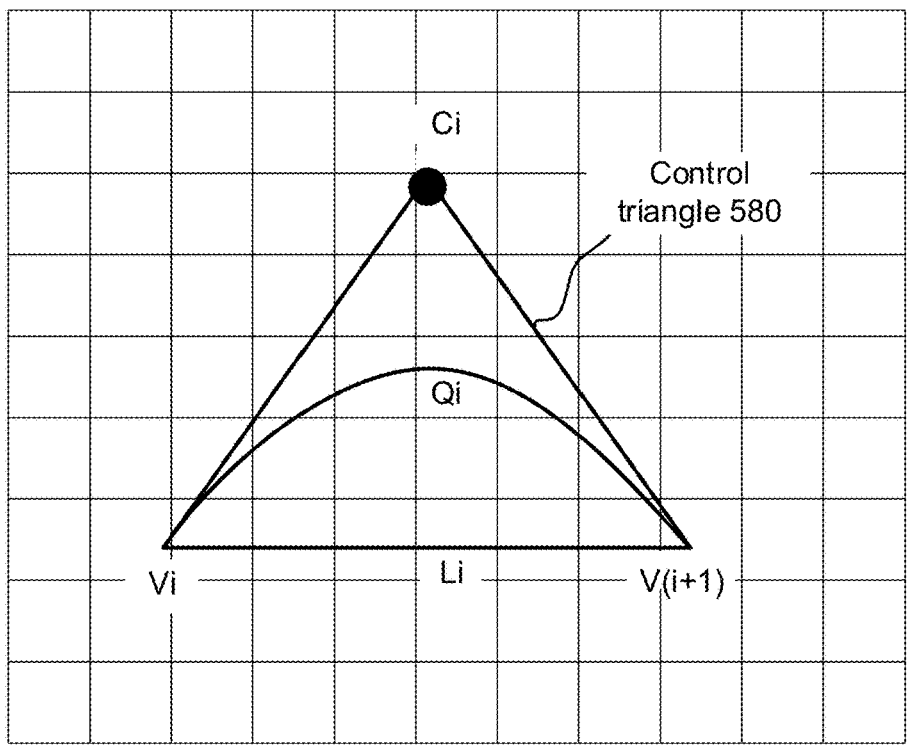

FIG. 5G illustrates an example quadratic Bezier curve Qi of the multiple quadratic Bezier curves Q1, . . . , QK. The quadratic Bezier curve Qi is defined by the vertices Vi, V(i+1), and control point Ci, where the index "i" is a number between 1 and K. Also illustrated is the line Li between the vertices Vi, V(i+1), and a control triangle 580 of the quadratic Bezier curve Qi. As seen in FIG. 5G, a quadratic Bezier curve, such as the quadratic Bezier curve Qi, lies entirely inside the control triangle 580 formed by its start point Vi, end point V(i+1), and control point Ci. However, it is possible that the quadratic Bezier curve is relatively close to the sides of the control triangle 580. For example, sections of the quadratic Bezier Qi curve near the start and end points may be relatively close, or fully or partially overlap, with the sides of control triangle 580. This is because two sides of the control triangle 580 are tangent to the quadratic Bezier curve Qi at the start and end points.

If the rasterizer 456 rasterizes the control triangle 580, this may result in problems of under coverage, where the quadratic Bezier curve Qi is relatively close to, or at least partially overlaps with, the sides of the control triangle 580. Thus, if the rasterizer 456 rasterizes the control triangle 580, sections of the quadratic Bezier curve Qi overlapping the control triangle 580 may not be fully rendered.

Figure 5H:
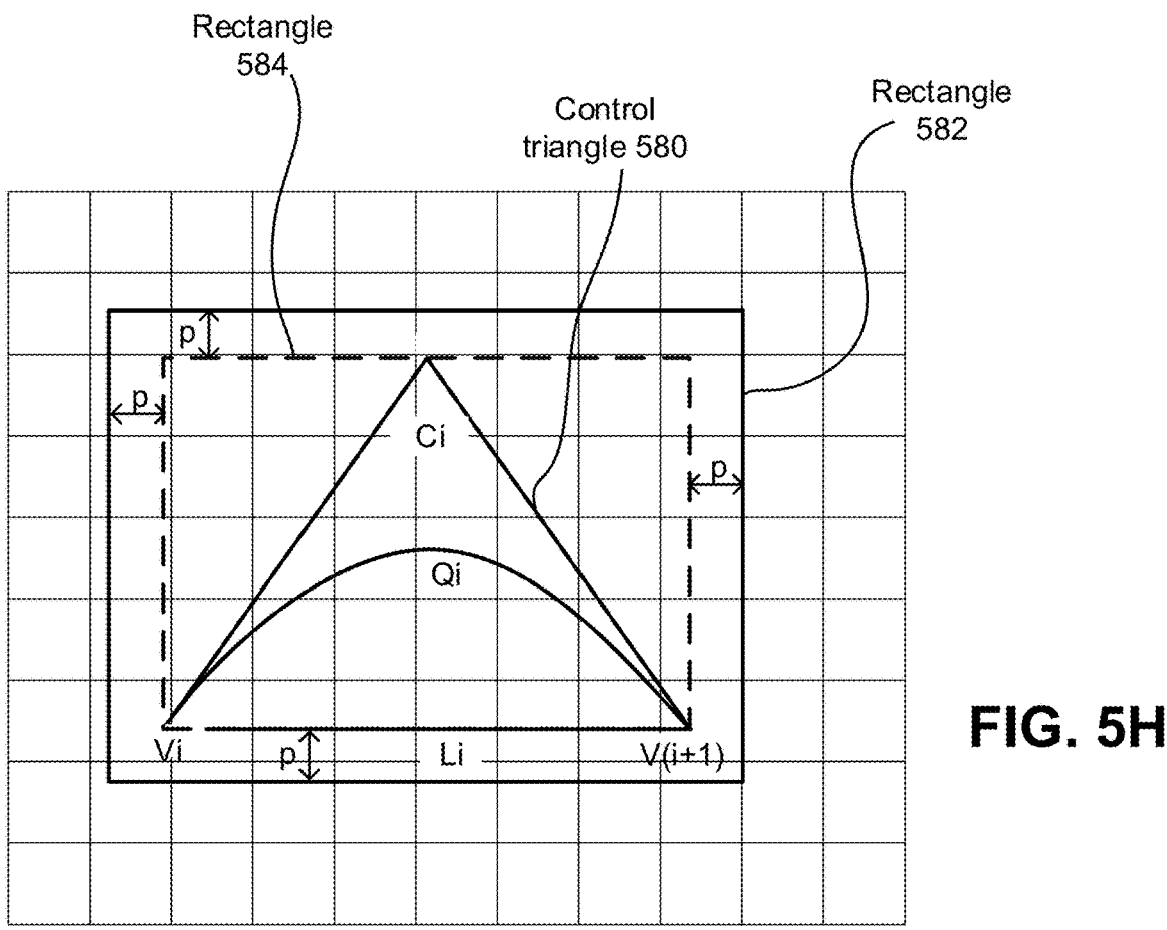

In some embodiments, to overcome this problem of under coverage, the control triangle 580 is expanded in all directions, to generate an axis aligned bounding box, as illustrated in FIG. 5H. For example, the control triangle 580 defines a rectangle 584 (illustrated using dotted lines in FIG. 5H) that passes through the vertices Vi, V(i+1), and the control point Ci. A rectangle 582 is generated, such that the rectangle 584 has a clearance of "p" on all sides with respect to the rectangle 584. The quadratic Bezier curve Qi is now entirely within the rectangle 582. This rectangular region 582 is output from the geometry shader 452 for rasterization to the rasterizer 456. The rectangular region 582 fully encompasses the control triangle 580, such that there is a margin "p" between corners of the control triangle 580 and the sides of the rectangular region 582.

The geometric shader 452 generates the rectangular area 582 as follows. The base of the control triangle 580 is offset by a certain number of pixels that corresponds to "p" of FIG. 5H. In an example, a base of the control triangle 580 is assumed to be the line Li joining the vertices V1, V(i+1), and an apex of the control triangle 580 is assumed to be the control point Ci. The above discussed offset is in the normal direction to the base of the control triangle 580 and opposite to the apex. The offset "p" is pre-defined and usually set to 1 pixel or 2 pixels (e.g., based on display resolution of the display 143), although the offset can be higher in some examples. Similar offset is performed on the apex as well, in a direction opposite the base of the control triangle 580. The offset is carried out in horizontal directions as well. Finally, the rectangle 582 is computed using the offsets. The geometric shader 452 outputs the rectangle 582 in the form of multiple triangular strips.

In some embodiments, once the fragment shader 460 receives the rasterized multiple quadratic Bezier curves, the fragment shader 460 renders the multiple quadratic Bezier curves employing any appropriate implicitization technique. Merely as an example, the fragment shader 460 computes signed distance of each fragment from a quadratic Bezier curve using an implicit form of quadratic Bezier, and modulates an alpha parameter based on the signed distance of the pixel from the quadratic Bezier curve.

Figure 5I:
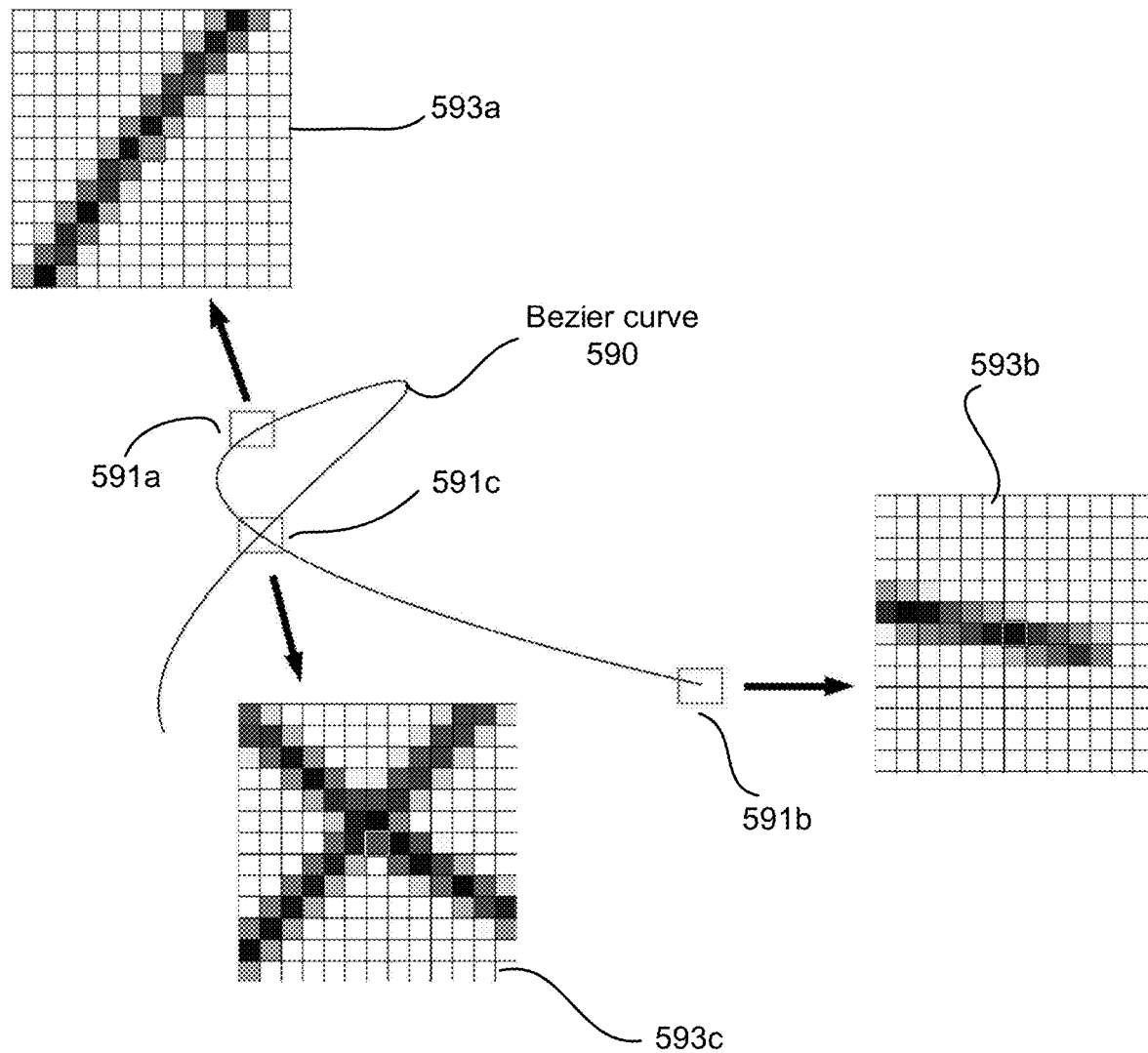

FIG. 5I illustrates a cubic Bezier curve 590, and magnified views 593a, 593b, 593c of sections 591a, 591b, 591c of the cubic Bezier curve 590 as rendered on a display (e.g., display 143). The sections 591a, 591b are not on an intersection between two lines of the curve 590, while section 591c is on an intersection between two lines of the curve 590. Antialiasing quality at different sections 591a, 591b, 591c of the cubic Bezier curve 590 are respectively illustrated in the magnified views 593a, 593b, 593c. As seen in FIG. 5I, the techniques discussed herein with respect to FIGS. 5A1-5H result in good antialiasing throughout the Bezier curve. Thus, problem of under-coverage at edges of the Bezier curves is avoided.

Figure 6:
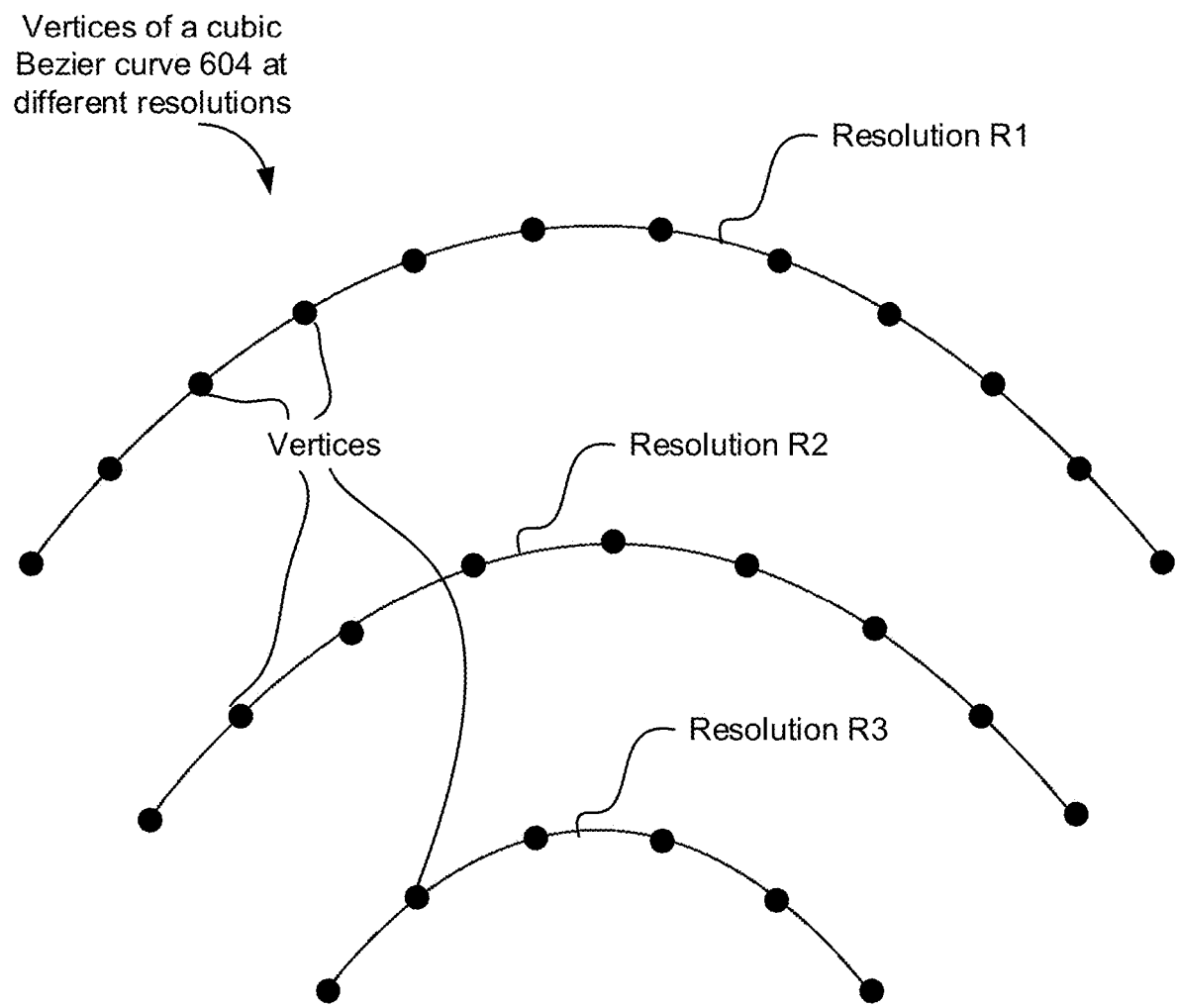
FIG. 6 illustrates adaptive tessellation by a graphics pipeline of a GPU while rendering a Bezier curve at different zoom levels or resolutions, in accordance with various embodiments of the present disclosure.

FIG. 6 illustrates adaptive tessellation by the graphics pipeline 432 of the GPU 104 while rendering a Bezier curve 604 at different zoom levels or resolution levels (where zoom level and resolution is used interchangeably herein), in accordance with various embodiments of the present disclosure. For example, the curve 604 is rendered at zoom levels or resolutions R1, R2, and R3, where R1 is higher than R2, and R2 is higher than R3 (i.e., R1>R2>R3). As seen, at lower zoom level R3, a length of the curve 604 is relatively small, and relatively lower number of vertices (e.g., six vertices) may be generated by the tessellation module 438. At medium zoom level R2, the length of the curve 604 is medium, and medium number of vertices (e.g., nine vertices) may be generated by the tessellation module 438. At high zoom level R1, the length of the curve 604 is relatively large, and relatively large number of vertices (e.g., twelve vertices) may be generated by the tessellation module 438. Thus, the number K discussed with respect to FIGS. 5A1-5I is 5 at resolution level R3, is 8 at resolution level R2, and is 11 at resolution level R3.

As discussed, the tessellation module 438 computes a number of vertices adaptively, and re-computes the number of vertices if needed, based on a resolution at which the curve 604 is being viewed in the display 143. It is to be noted that the resolutions R1, R2, and R3 are not the display resolution of the display 143. For example, these are not representative of whether the display 143 is a 4 k display, a 1080p display, etc. Rather, the resolutions R1, R2, and R3 are the zoom levels or magnification levels of the curve 604 while being displayed.

Figure 7:
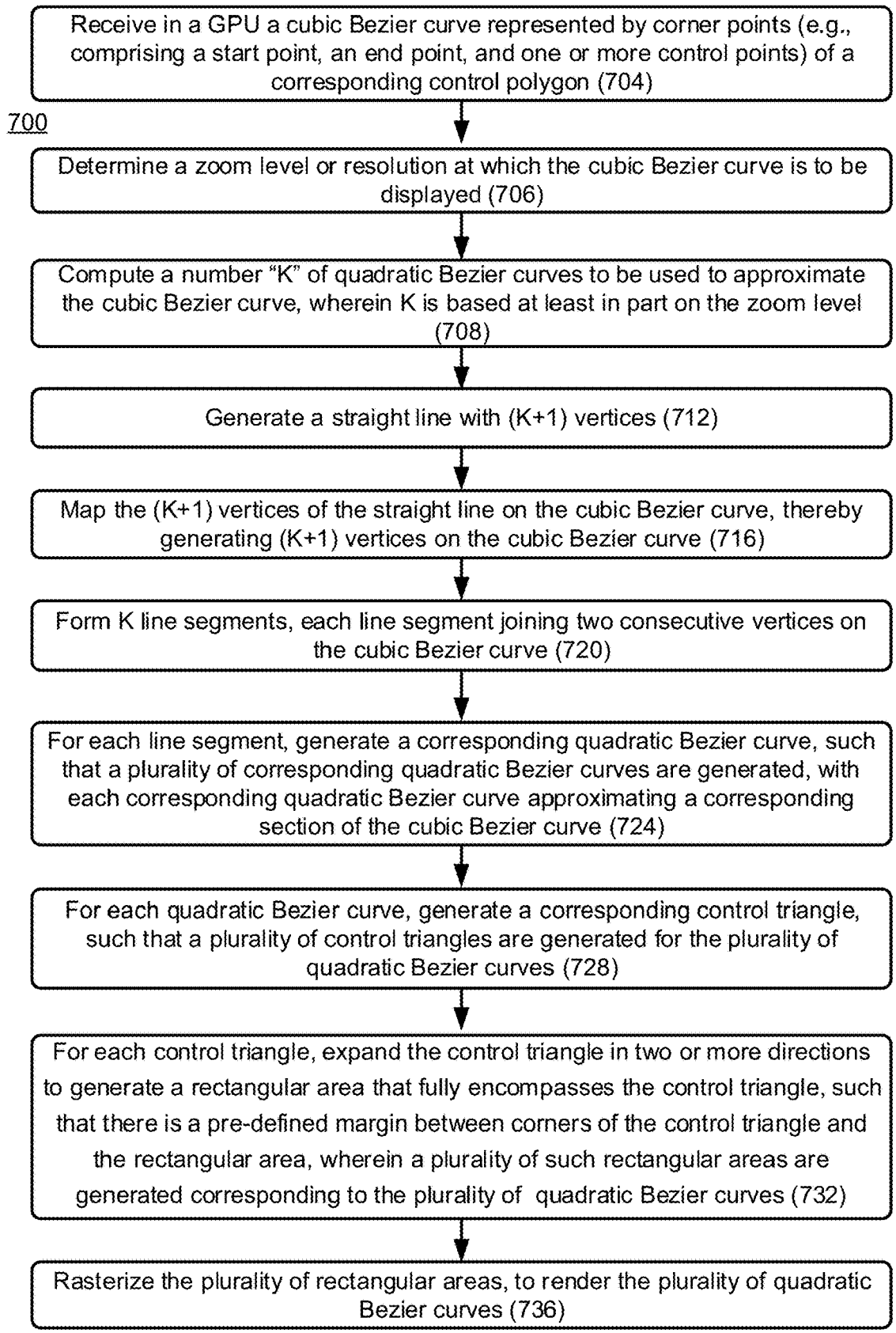
FIG. 7 is a flowchart illustrating an example method for rendering a cubic Bezier curve on a GPU, in accordance with some embodiments of the present disclosure.

FIG. 7 is a flowchart illustrating an example method 700 for rendering a cubic Bezier curve on a GPU, such as the GPU 104 of FIGS. 1 and 4, in accordance with some embodiments of the present disclosure. Method 700 can be implemented, for example, using the system architecture illustrated in FIGS. 1 and/or 4, and described herein. However other system architectures can be used in other embodiments, as apparent in light of this disclosure. To this end, the correlation of the various functions shown in FIG. 7 to the specific components and functions illustrated in FIGS. 1 and 4 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, the primitive assembly 450 may be combined with the TES 448.

At 704, a cubic Bezier curve represented by corner points of a corresponding control polygon is received in a GPU, such as the GPU 104. For example, as discussed with respect to FIG. 5A2, the vertex shader 436 of the pipeline 432 of the GPU 104 receives the corner points or vertices of the control polygon 515 of the cubic Bezier curve 502. In an example, the vertex shader 436 of the pipeline 432 receives the corner points as a "patch" primitive, as discussed herein. The corner points comprise the start point 506, the end point 508, and one or more control points 504a, 504b.

At 706, a zoom level or resolution at which the cubic Bezier curve is to be displayed is determined, e.g., by the TCS 440. At 708, a number of quadratic Bezier curves to be used to approximate the cubic Bezier curve is computed, e.g., by the TCS 440. For example, as discussed with respect to FIG. 5B, the TCS 440 calculates that "K" number of quadratic Bezier curves are to be used to approximate the cubic Bezier curve. The number K is based on the resolution or zoom level with which the curve is to be displayed (e.g., as discussed with respect to FIG. 6), a length of the curve (e.g., as discussed with respect to FIG. 6), and/or a complexity of the curve.

At 712, the TPG 444 generates a straight line with (K+1) vertices (e.g., vertices V'1, V'2, . . . , V'(K+1)), as discussed with respect to FIG. 5B. Thus, the straight line is divided in K segments of equal lengths.

At 716, individual ones of the (K+1) number of vertices of the straight line may be mapped on the cubic Bezier curve, e.g., by the TES 448. Thus, (K+1) discrete points or vertices may now be on the cubic Bezier curve, as discussed with respect to FIG. 5C.

At 720, K line segments may be formed, e.g., by the TES 448 and/or the primitive assembly 450. Each line segment joins two corresponding consecutive vertices on the cubic Bezier curve, as discussed with respect to FIG. 5D. For example, FIG. 5D illustrates the line segments L1, L2, . . . , LK. The K line segments may be input to the geometric shader 452.

At 724, for each line segment, a corresponding quadratic Bezier curve may be generated, e.g., by the geometric shader 452. Thus, a plurality of quadratic Bezier curves may be generated, with each quadratic Bezier curve approximating a corresponding section of the cubic Bezier curve, as discussed with respect to FIG. 5E.

At 728, for each quadratic Bezier curve, a corresponding control triangle is generated, such that a plurality of control triangles is generated for the plurality of quadratic Bezier curves. For example, the control points of the quadratic Bezier curves may be computed, and then the control triangles may be generated, as discussed with respect to FIG. 5F. In an example, the generation of the control triangles are performed by the geometric shader 452. In an example, operations at 724 and 728 are combined—that is, the quadratic Bezier curves are generated by generating the control points and the control triangles by the geometric shader 452.

At 732, individual control triangle is expanded in two or more directions to generate a corresponding rectangular area that fully encompasses the control triangle. For example, there is a pre-defined margin "p" between corners of the control triangle and the sides of the rectangular area, as discussed with respect to FIG. 5H. In an example, a plurality of such rectangular areas is generated corresponding to the plurality of quadratic Bezier curves. Such expansion ensures that sections of the quadratic Bezier curve that are relatively near to, fully overlapping and/or at least partially overlapping the control triangle is correctly rasterized and rendered, and issues of under-coverage does not occur. In some embodiments, the expansion is performed by the geometric shader 452. At 736, the plurality of rectangular areas is rasterized (e.g., by the rasterizer 456) and the plurality of quadratic Bezier curves may be rendered by the fragment shader 460.

Figure 8:
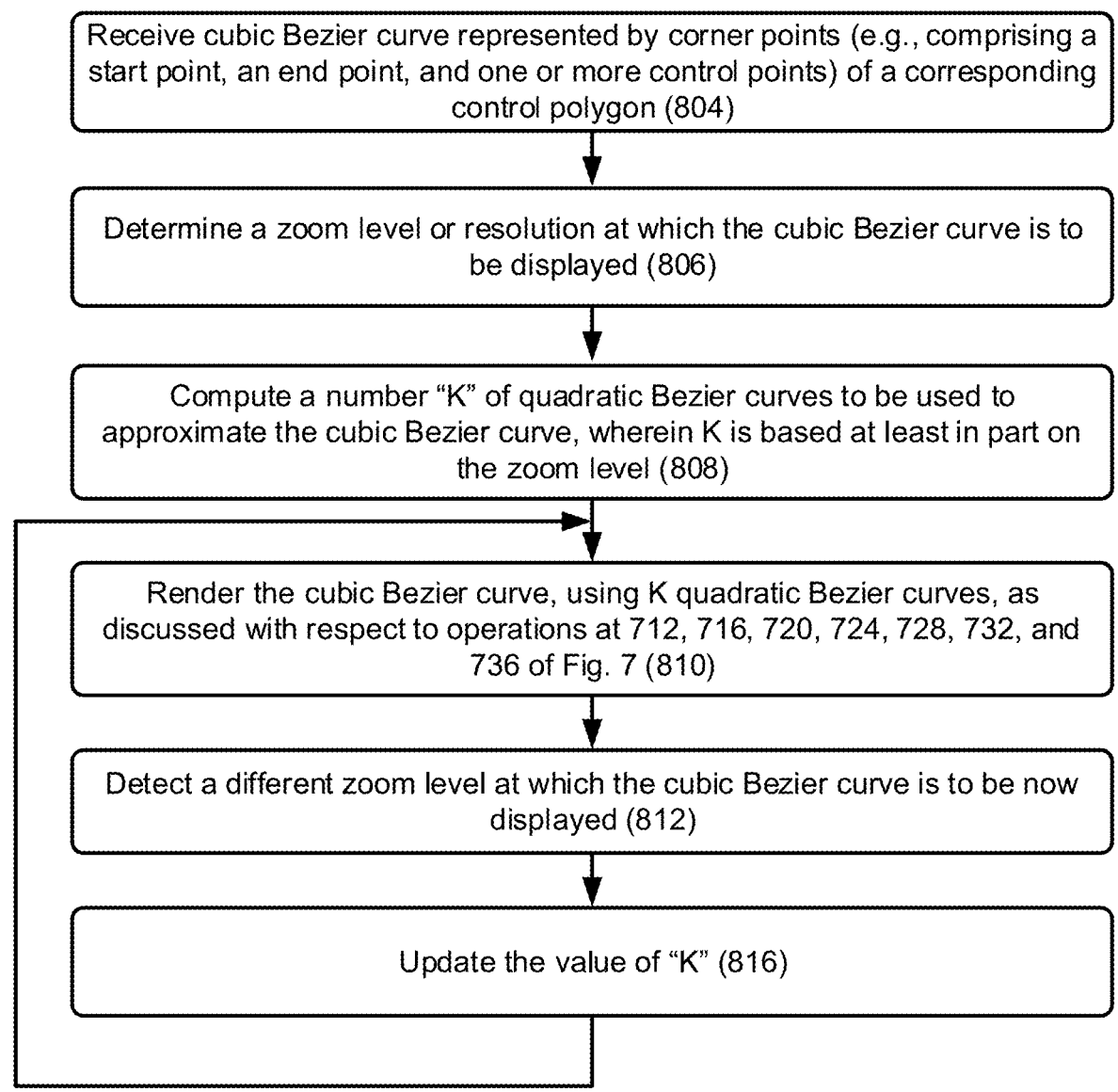
FIG. 8 is a flowchart illustrating an example method for adaptively rendering a cubic Bezier curve on a GPU, based on a zoom level with which the cubic Bezier curves is to be displayed, in accordance with some embodiments of the present disclosure.

FIG. 8 is a flowchart illustrating an example method 800 for adaptively rendering a cubic Bezier curve on a GPU (such as the GPU 104 of FIGS. 1 and 4), based on a zoom level with which the cubic Bezier curves is to be displayed, in accordance with some embodiments of the present disclosure. Method 800 can be implemented, for example, using the system architecture illustrated in FIGS. 1 and/or 4, and described herein. However other system architectures can be used in other embodiments, as apparent in light of this disclosure. To this end, the correlation of the various functions shown in FIG. 8 to the specific components and functions illustrated in FIGS. 1 and 4 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, the primitive assembly 450 may be combined with the TES 448.

At 804 of the method 800, a cubic Bezier curve represented by corner points (e.g., comprising a start point, an end point, and one or more control points) of a corresponding control polygon is received. At 806, a zoom level or resolution at which the cubic Bezier curve is to be displayed is determined, e.g., by the TCS 440. At 808, a number "K" of quadratic Bezier curves to be used to approximate the cubic Bezier curve is computed, where the number K is based at least in part on the zoom level. The operations at 804, 806, and 808 may be respectively similar to those at 704, 706, 708 of the method 700, and hence, are not discussed in further detail.

At 810, the cubic Bezier curve is rendered, using K quadratic Bezier curves, as discussed with respect to operations at 712, 716, 720, 724, 728, 732, and 736 of the method 700 of FIG. 7.

At 812, a different zoom level at which the cubic Bezier curve is to be now displayed is detected. Such a change in the zoom level may be based on a user trying to change the zoom level (e.g., magnifying or shrinking) portions of the cubic Bezier curve being displayed on the display 143. Accordingly, at 816, the TCS 440 updates the value of "K," which was originally computed at 808. For example, as discussed with respect to FIG. 6, an increase in the zoom level results in increasing the value of K, and vice versa. The method 800 then loops back to 810, where the cubic Bezier curve is re-rendered using the updated value of K.

Numerous variations and configurations will be apparent in light of this disclosure and the following examples.

Example 1. A method for processing in a graphics processing unit (GPU) a cubic Bezier curve for display, the method comprising: receiving, at the GPU, a plurality of corner points of a control polygon, the control polygon representing the cubic Bezier curve; generating, at the GPU, a plurality of vertices on the cubic Bezier curve, the plurality of vertices dividing the cubic Bezier curve into a plurality of segments; generating, at least in part in parallel at the GPU, a plurality of quadratic Bezier curves, wherein an individual quadratic Bezier curve of the plurality of quadratic Bezier curves (i) is between corresponding two consecutive vertices of the plurality of vertices and (ii) approximates a corresponding segment of the plurality of segments of the cubic Bezier curve; and rendering the plurality of quadratic Bezier curves for display.

Example 2. The method of example 1, further comprising: computing, at a Tessellation Control Shader (TCS) of a graphics pipeline of the GPU, a number of vertices included in the plurality of vertices, wherein the number of vertices is based on a resolution with which the cubic Bezier curve is to be displayed.

Example 3. The method of any of examples 1-2, wherein generating the plurality of vertices comprises: determining that the cubic Bezier curve is to be displayed at a first resolution; generating, in response to determining that the cubic Bezier curve is to be displayed at the first resolution, the plurality of vertices comprising a first number of vertices; determining that the cubic Bezier curve is to be re-displayed at a second resolution; and re-generating, in response to determining that the cubic Bezier curve is to be re-displayed at the second resolution, the plurality of vertices comprising a second number of vertices that is different from the first number of vertices.

Example 4. The method of any of examples 1-3, wherein generating the plurality of quadratic Bezier curves comprises: generating, at a Tessellation Evaluation Shader and/or a primitive assembly of a graphics pipeline of the GPU, a plurality of straight-line segments, each straight-line segment between corresponding two consecutive vertices of the plurality of vertices; receiving, by a geometric shader of the graphics pipeline of the GPU, the plurality of straight-line segments; and generating, by the geometric shader based on the plurality of straight-line segments, the plurality of quadratic Bezier curves, each quadratic Bezier curve of the plurality of quadratic Bezier curves represented by (i) two corresponding consecutive vertices and (ii) a corresponding control point that is calculated by the geometric shader.

Example 5. The method of example 4, wherein generating, by the geometric shader, the plurality of quadratic Bezier curves comprises: invoking the geometric shader for at least a first instance and a second instance, wherein invocation of the geometric shader for the first instance is for generation of a first quadratic Bezier curve of the plurality of quadratic Bezier curves, and invocation of the geometric shader for the second instance is for generation of a second quadratic Bezier curve of the plurality of quadratic Bezier curves, and wherein the invocation of the geometric shader for the first instance and the second instance are at least in part performed in parallel and occurs at least in part simultaneously.

Example 6. The method of example 5, wherein the geometric shader is executed at the first instance by a first thread executing on a first execution unit of the GPU, and wherein the geometric shader is executed at the second instance by a second thread executing on a second execution unit of the GPU.

Example 7. The method of example 5, wherein the geometric shader is executed at the first instance by a first thread executing on a first execution unit of the GPU, and wherein the geometric shader is executed at the second instance by a second thread executing on the first execution unit of the GPU.

Example 8. The method of any of examples 4-7, wherein: a first quadratic Bezier curve of the plurality of quadratic Bezier curves is associated with a corresponding first straight-line segment of the plurality of straight-line segments, such that two vertices on two ends of the first straight-line segment form a start point and an end point of the first quadratic Bezier curve.

Example 9. The method of any of examples 4-8, wherein the plurality of straight-line segments is generated at least in part in parallel, by parallel invocation of a corresponding plurality of instances of the Tessellation Evaluation Shader and/or the primitive assembly.

Example 10. The method of any of examples 1-9, wherein the plurality of vertices is a first plurality of vertices, and where generating the first plurality of vertices on the cubic Bezier curve comprises: generating, at a tessellation primitive generator of a graphics pipeline of the GPU, a straight line comprising a second plurality of vertices; and mapping, at a tessellation evaluation shader of the graphics pipeline of the GPU, an individual vertex of the second plurality of vertices on the straight line to a corresponding vertex of the first plurality of vertices on the cubic Bezier curve.

Example 11. The method of any of examples 1-10, wherein rendering the plurality of quadratic Bezier curves for display comprises: computing, by a geometric shader of a graphics pipeline of the GPU, for a first quadratic Bezier curve of the plurality of quadratic Bezier curves, three vertices defining a control triangle that represents the first quadratic Bezier curve; expanding, by the geometric shader, the control triangle in two or more directions to generate an area that fully encompasses the control triangle, such that there is a pre-defined margin between corners of the control triangle and the area; and rasterizing and rendering the area.

Example 12. The method of any of examples 1-11, wherein receiving the plurality of corner points defining the control polygon comprises: receiving, at a vertex shader of a graphics pipeline of the GPU, the plurality of corner points as a patch primitive.

Example 13. The method of any of examples 1-12, wherein the plurality of corner points of the control polygon comprises a start point of the cubic Bezier curve, an end point of the cubic Bezier curve, and two control points of the cubic Bezier curve.

Example 14. A graphics processing unit comprising: one or more execution units; and a graphics pipeline executable by the one or more execution units to: receive a patch primitive associated with a cubic Bezier curve; determine a first zoom level with which the cubic Bezier curve is to be displayed; generate a first number of quadratic Bezier curves from the cubic Bezier curve, the first number based on the first zoom level; render the first number of quadratic Bezier curves, to enable display of the cubic Bezier curve at the first zoom level; determine a second zoom level with which the cubic Bezier curve is to be re-displayed; generate a second number of quadratic Bezier curves from the cubic Bezier curve, the second number based on the second zoom level and different from the first number; and render the second number of quadratic Bezier curves, to enable display of the cubic Bezier curve at the second zoom level.

Example 15. The graphics processing unit of example 14, wherein: the first zoom level is higher than the second zoom level; and the first number of higher than the second number.

Example 16. The graphics processing unit of any of examples 14-15, wherein the first number and the second number are based on a length of the cubic Bezier curve.

Example 17. The graphics processing unit of any of examples 14-16, wherein the patch primitive comprises a start point of the cubic Bezier curve, an end point of the cubic Bezier curve, and two control points of the cubic Bezier curve.

Example 18. The graphics processing unit of any of examples 14-17, wherein to generate the first number of quadratic Bezier curves from the cubic Bezier curve, the graphics processing unit is executable to: generate a plurality of vertices on the cubic Bezier curve, the plurality of vertices dividing the cubic Bezier curve into a plurality of segments, a number of vertices included in the plurality of vertices is a sum of the first number and one; and generate the first number of quadratic Bezier curves, such that an individual quadratic Bezier curve of the first number of quadratic Bezier curves (i) is between corresponding two consecutive vertices of the plurality of vertices and (ii) approximates a corresponding segment of the plurality of segments of the cubic Bezier curve.

Example 19. The graphics processing unit of example 18, wherein to generate the first number of quadratic Bezier curves from the cubic Bezier curve, the graphics processing unit is executable to: generate a first number of straight-line segments, such that an individual straight-line segment of the first number of straight-line segments is between corresponding two consecutive vertices of the plurality of vertices; and replace each straight-line segment of the first number of straight-line segments with a corresponding quadratic Bezier curve of the first number of quadratic Bezier curves.

Example 20. The graphics processing unit of any of examples 14-19, wherein the plurality of vertices on the cubic Bezier curve is a first plurality of vertices, and wherein to generate the first plurality of vertices on the cubic Bezier curve, the graphics processing unit is executable to: generate a straight line comprising a second plurality of vertices; and map an individual vertex of the second plurality of vertices on the straight line to a corresponding vertex of the first plurality of vertices on the cubic Bezier curve.

Example 21. The graphics processing unit of any of examples 14-20, wherein to render the first number of quadratic Bezier curves, the graphics processing unit is executable to: compute, for a first quadratic Bezier curve of the first number of quadratic Bezier curves, three vertices defining a control triangle that represents the first quadratic Bezier curve; expand the control triangle in two or more directions to generate an area that fully encompasses the control triangle, such that there is a pre-defined margin corresponding to one or more display pixels between corners of the control triangle and the area; and rasterize and render the area.

Example 22. A computer program product including one or more non-transitory machine-readable mediums encoded with instructions that when executed by one or more processors cause a process to be carried out by a graphics processing unit (GPU) for processing a cubic Bezier curve for display, the process comprising: receiving a plurality of corner points of a control polygon, the control polygon representing the cubic Bezier curve; generating, at least in part in parallel, a plurality of vertices on the cubic Bezier curve that divides the cubic Bezier curve into a plurality of segments; generating, at least in part in parallel, a plurality of quadratic Bezier curves, wherein an individual quadratic Bezier curve of the plurality of quadratic Bezier curves (i) is between corresponding two consecutive vertices of the plurality of vertices and (ii) approximates a corresponding segment of the plurality of segments of the cubic Bezier curve; and rendering the plurality of quadratic Bezier curves for display.

Example 23. The computer program product of example 22, wherein the process further comprises: computing, at a Tessellation Control Shader (TCS) of a graphics pipeline of the GPU, a number of vertices included in the plurality of vertices, wherein the number of vertices is based on a resolution with which the cubic Bezier curve is to be displayed.

Example 24. The computer program product of any of examples 22-23, wherein generating the plurality of vertices comprises: generating, while the cubic Bezier curve is to be displayed at a first resolution, the plurality of vertices comprising a first number of vertices; and generating, while the cubic Bezier curve is to be re-displayed at a second resolution, the plurality of vertices comprising a second number of vertices that is different from the first number of vertices.

Example 25. The computer program product of any of examples 22-24, wherein generating the plurality of quadratic Bezier curves comprises: generating, at a Tessellation Evaluation Shader and/or a primitive assembly of a graphics pipeline of the GPU, a plurality of straight-line segments, each straight-line segment between corresponding two consecutive vertices of the plurality of vertices; receiving, by a geometric shader of the graphics pipeline of the GPU, the plurality of straight-line segments; and generating, by the geometric shader based on the plurality of straight-line segments, the plurality of quadratic Bezier curves, each quadratic Bezier curve of the plurality of quadratic Bezier curves represented by (i) two corresponding consecutive vertices and (ii) a corresponding control point that is calculated by the geometric shader.

Example 26. The computer program product of example 25, wherein: a first quadratic Bezier curve of the plurality of quadratic Bezier curves is associated with a corresponding first straight-line segment of the plurality of straight-line segments, such that two vertices on two ends of the first straight-line segment form a start point and an end point of the first quadratic Bezier curve.

Example 27. The computer program product of any of examples 22-26, wherein the plurality of vertices is a first plurality of vertices, and where generating the first plurality of vertices on the cubic Bezier curve comprises: generating, at a tessellation primitive generator of a graphics pipeline of the GPU, a straight line comprising a second plurality of vertices; and mapping, at a tessellation evaluation shader of the graphics pipeline of the GPU, each individual vertices of the second plurality of vertices on the straight line to corresponding vertices of the first plurality of vertices on the cubic Bezier curve.

Example 28. The computer program product of any of examples 22-27, wherein rendering the plurality of quadratic Bezier curves for display comprises: computing, by a geometric shader of a graphics pipeline of the GPU, for a first quadratic Bezier curve of the plurality of quadratic Bezier curves, three vertices defining a control triangle that represents the first quadratic Bezier curve; expanding, by the geometric shader, the control triangle in two or more directions to generate an area that fully encompasses the control triangle, such that there is a pre-defined margin between corners of the control triangle and the area; and rasterizing and rendering the area.

Example 29. The computer program product of any of examples 22-28, wherein receiving the plurality of corner points defining the control polygon comprises: receiving, at a vertex shader of a graphics pipeline of the GPU, the plurality of corner points as a patch primitive.

Example 30. The computer program product of any of examples 22-29, wherein the plurality of corner points of the control polygon comprises a start point of the cubic Bezier curve, an end point of the cubic Bezier curve, and two control points of the cubic Bezier curve.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for processing, in a graphics processing unit (GPU) of a computing device, a cubic Bezier curve for display, the method comprising:
   receiving, at a host interface of the GPU, a plurality of corner points of a control polygon, the control polygon representing the cubic Bezier curve, wherein the plurality of corner points are received via a bus that couples the GPU with a computing device memory resource;
   storing the plurality of corner points in a GPU memory resource;
   generating, by a tessellation evaluation shader at the GPU, a quantity (K+1) vertices on the cubic Bezier curve, the (K+1) vertices dividing the cubic Bezier curve into K segments, K≥2;
   generating, at least in part in parallel by a geometric shader at the GPU, K quadratic Bezier curves, wherein an individual one of the K quadratic Bezier curves (i) is between corresponding two consecutive vertices of the (K+1) vertices and (ii) approximates a corresponding segment of the K segments of the cubic Bezier curve;
   rendering, by a fragment shader at the GPU, the K quadratic Bezier curves for display;
   after rendering the K quadratic Bezier curves, retrieving the plurality of corner points from the GPU memory resource;
   generating, by the geometric shader, K' quadratic Bezier curves from the cubic Bezier curve, the K' quadratic Bezier curves based on an updated zoom level, K≠K'; and
   rendering, by the fragment shader, the K' quadratic Bezier curves to enable display of the cubic Bezier curve at the updated zoom level;
   wherein K is an integer that represents a first quantity of generated quadradic Bezier curves; and
   wherein K' is an integer that represents a second quantity of generated quadradic Bezier curves based on the updated zoom level.

2. The method of claim 1, further comprising computing, by a Tessellation Control Shader at the GPU, the quantity (K+1) based on an initial zoom level at which the cubic Bezier curve is to be displayed.

3. The method of claim 1, further comprising:
determining, by a tessellation control shader at the GPU, that the cubic Bezier curve is to be displayed at an initial zoom level; and
computing, by the tessellation control shader, the quantity (K+1) based on the initial zoom level.

4. The method of claim 1, wherein generating the K quadratic Bezier curves comprises:
generating, at the GPU, K straight-line segments, each straight-line segment between corresponding two consecutive vertices of the (K+1) vertices;
receiving, by the geometric shader, the K straight-line segments; and
generating, by the geometric shader based on the K straight-line segments, the K quadratic Bezier curves, each quadratic Bezier curve represented by (i) two corresponding consecutive vertices and (ii) a corresponding control point that is calculated by the geometric shader.

5. The method of claim 1, wherein:
generating the K quadratic Bezier curves comprises invoking the geometric shader for at least a first instance and a second instance; and
invoking the geometric shader for the first instance is for generation of a first quadratic Bezier curve of the K quadratic Bezier curves, and invoking the geometric shader for the second instance is for generation of a second quadratic Bezier curve of the K quadratic Bezier curves.

6. The method of claim 4, wherein a first quadratic Bezier curve of the K quadratic Bezier curves is associated with a corresponding first straight-line segment of the K straight-line segments, such that two vertices on two ends of the first straight-line segment form a start point and an end point, respectively, of the first quadratic Bezier curve.

7. The method of claim 1, wherein generating the (K+1) vertices on the cubic Bezier curve comprises:
generating a straight line comprising (K+1) straight line vertices; and
mapping, by the tessellation evaluation shader, an individual straight line vertex of the (K+1) straight line vertices to a corresponding vertex of the (K+1) vertices on the cubic Bezier curve.

8. The method of claim 1, wherein rendering the K quadratic Bezier curves for display comprises:
computing, by the geometric shader, for a first quadratic Bezier curve of the K quadratic Bezier curves, three vertices defining a control triangle that represents the first quadratic Bezier curve;
expanding, by the geometric shader, the control triangle in two or more directions to generate an area that fully encompasses the control triangle, such that there is a pre-defined margin between corners of the control triangle and the area; and
rasterizing and rendering the area.

9. The method of claim 1, wherein receiving the plurality of corner points of the control polygon comprises receiving, by a vertex shader at the GPU, the plurality of corner points as a patch primitive.

10. A communicating device comprising:
a central processing unit (CPU);
a device memory resource coupled to the CPU via a bus; and
a graphics processing unit (GPU) that comprises:
a GPU memory resource;
a host interface configured to receive data representing a patch primitive associated with a cubic Bezier curve via the bus, and to further store the received data in the GPU memory resource;
a tessellation control shader configured to determine a first zoom level with which the cubic Bezier curve is to be displayed;
a geometric shader configured to generate K quadratic Bezier curves from the cubic Bezier curve, wherein K is based on the first zoom level; and
a fragment shader configured to render the K quadratic Bezier curves to enable display of the cubic Bezier curve at the first zoom level;
wherein K is an integer that represents a first quantity of generated quadradic Bezier curves based on the first zoom level;
wherein the tessellation control shader is further configured to, after the K quadratic Bezier curves are rendered, and in response to user input establishing a second zoom level with which the cubic Bezier curve is to be redisplayed, (a) retrieve, from the GPU memory resource, the data representing the cubic Bezier curve, and (b) generate K' quadratic Bezier curves from the cubic Bezier curve;
wherein K' is an integer that represents a second quantity of generated quadradic Bezier curves based on the second zoom level, K≠K'; and
wherein the fragment shader is further configured to render the K' quadratic Bezier curves to enable display of the cubic Bezier curve at the second zoom level.

11. The graphics processing unit of claim 10, wherein:
K>K'; and
the first zoom level is higher than the second zoom level.

12. The graphics processing unit of claim 10, wherein K and K' are based on a length of the cubic Bezier curve.

13. The graphics processing unit of claim 10, wherein the patch primitive comprises a start point of the cubic Bezier curve, an end point of the cubic Bezier curve, and two control points of the cubic Bezier curve.

14. The graphics processing unit of claim 10, wherein:
to generate the K quadratic Bezier curves from the cubic Bezier curve, the GPU is executable to generate (K+1) vertices on the cubic Bezier curve, the (K+1) vertices dividing the cubic Bezier curve into K segments; and
an individual quadratic Bezier curve of the K quadratic Bezier curves (i) is between corresponding two consecutive vertices of the (K+1) vertices and (ii) approximates a corresponding segment of the K segments of the cubic Bezier curve.

15. The graphics processing unit of claim 14, wherein to generate the K quadratic Bezier curves from the cubic Bezier curve, the GPU is executable to:
generate K straight-line segments, such that an individual straight-line segment of the K straight-line segments is between corresponding two consecutive vertices of the (K+1) vertices; and
replace each straight-line segment of the K straight-line segments with a corresponding quadratic Bezier curve of the K quadratic Bezier curves.

16. The graphics processing unit of claim 14, wherein to generate the (K+1) vertices on the cubic Bezier curve, the GPU is executable to:
generate a straight line comprising (K+1) straight line vertices; and
map an individual straight line vertex of the (K+1) straight line vertices to a corresponding vertex of the (K+1) vertices on the cubic Bezier curve.

17. The graphics processing unit of claim 10, wherein to render the K quadratic Bezier curves, the GPU is executable to:
- compute, for a first quadratic Bezier curve of the K quadratic Bezier curves, three vertices defining a control triangle that represents the first quadratic Bezier curve;
- expand the control triangle in two or more directions to generate an area that fully encompasses the control triangle, such that there is a pre-defined margin corresponding to one or more display pixels between corners of the control triangle and the area; and
- rasterize and render the area.

18. A computer program product including one or more non-transitory machine-readable mediums encoded with instructions that when executed by one or more processors cause a process to be carried out by a graphics processing unit (GPU) of a computing device, the process for processing a cubic Bezier curve for display, the process comprising:
- receiving, at a host interface of the GPU, a plurality of corner points of a control polygon, the control polygon representing the cubic Bezier curve, wherein the plurality of corner points are received via a bus that couples the GPU with a computing device memory resource;
- storing the plurality of corner points in a GPU memory resource;
- generating, by a tessellation evaluation shader at the GPU, a quantity (K+1) vertices on the cubic Bezier curve, the (K+1) vertices dividing the cubic Bezier curve into K segments, K≥2;
- generating, at least in part in parallel by a geometric shader at the GPU, K quadratic Bezier curves, wherein an individual one of the K quadratic Bezier curves (i) is between corresponding two consecutive vertices of the (K+1) vertices and (ii) approximates a corresponding segment of the K segments of the cubic Bezier curve;
- rendering, by a fragment shader at the GPU, the K quadratic Bezier curves for display;
- after rendering the K quadratic Bezier curves, retrieving the plurality of corner points from the GPU memory resource;
- generating, by the geometric shader, K' quadratic Bezier curves from the cubic Bezier curve, the K' quadratic Bezier curves based on an updated zoom level, K≠K'; and
- rendering, by the fragment shader, the K' quadratic Bezier curves to enable display of the cubic Bezier curve at the updated zoom level;
- wherein K is an integer that represents a first quantity of generated quadradic Bezier curves; and
- wherein K' is an integer that represents a second quantity of generated quadradic Bezier curves based on the updated zoom level.

19. The computer program product of claim 18, wherein the process further comprises computing, by a Tessellation Control Shader at the GPU, the quantity (K+1) based on an initial zoom level at which the cubic Bezier curve is to be displayed.

20. The computer program product of claim 18, wherein K>K'.

* * * * *